(12) United States Patent
Michaels et al.

(10) Patent No.: US 11,385,339 B2
(45) Date of Patent: Jul. 12, 2022

(54) LIDAR WAVEFORM GENERATION SYSTEM

(71) Applicant: OURS Technology, LLC, Mountain View, CA (US)

(72) Inventors: Andrew Steil Michaels, Santa Clara, CA (US); Sen Lin, Santa Clara, CA (US)

(73) Assignee: OURS Technology, LLC, Mountain View, CA (US)

( * ) Notice: Subject to any disclaimer, the term of this patent is extended or adjusted under 35 U.S.C. 154(b) by 0 days.

(21) Appl. No.: 17/463,309

(22) Filed: Aug. 31, 2021

(65) Prior Publication Data

US 2022/0075041 A1     Mar. 10, 2022

Related U.S. Application Data

(60) Provisional application No. 63/074,832, filed on Sep. 4, 2020.

(51) Int. Cl.
| | |
|---|---|
| *G01S 7/497* | (2006.01) |
| *G01S 17/931* | (2020.01) |
| *G01S 7/493* | (2006.01) |
| *H01S 3/00* | (2006.01) |

(52) U.S. Cl.
CPC ............ *G01S 7/497* (2013.01); *G01S 7/493* (2013.01); *G01S 17/931* (2020.01); *H01S 3/0057* (2013.01); *H01S 3/0085* (2013.01)

(58) Field of Classification Search
None
See application file for complete search history.

(56) References Cited

U.S. PATENT DOCUMENTS

| | | | |
|---|---|---|---|
| 5,847,817 | A | 12/1998 | Zediker et al. |
| 6,219,144 | B1 | 4/2001 | Hill et al. |
| 6,580,497 | B1 | 6/2003 | Asaka et al. |
| 9,081,090 | B2 | 7/2015 | Sebastian et al. |
| 11,169,246 | B1 | 11/2021 | Viswanatha et al. |
| 2010/0085992 | A1 | 4/2010 | Rakuljic et al. |

(Continued)

FOREIGN PATENT DOCUMENTS

| | | |
|---|---|---|
| JP | 6919972 B2 | 8/2021 |
| WO | 2017191285 A1 | 11/2017 |

(Continued)

OTHER PUBLICATIONS

Final Office Action, U.S. Appl. No. 17/463,263, Notification Date: Feb. 7, 2022, 15 pages.

(Continued)

*Primary Examiner* — Eric L Bolda
(74) *Attorney, Agent, or Firm* — Freestone Intellectual Property Law PLLC; Aaron J. Visbeek; William J. Pigott

(57) ABSTRACT

A light detection and ranging (LIDAR) system includes a LIDAR measurement unit, a reference measurement unit, and a phase cancellation unit. The LIDAR measurement unit estimates a time for which a laser beam travels. The reference measurement unit determines a phase of a laser source. The phase cancellation unit identifies phase noise and cancels the phase noise from the laser beam, at least partially based on the phase of the laser source and the time for which the laser beam travels. The denoised signal is used to determine the range between a laser source and a target.

18 Claims, 13 Drawing Sheets

(56) References Cited

U.S. PATENT DOCUMENTS

| | | |
|---|---|---|
| 2010/0271615 A1 | 10/2010 | Sebastian et al. |
| 2014/0269790 A1 | 9/2014 | Sebastian et al. |
| 2017/0302282 A1 | 10/2017 | Josefsberg et al. |
| 2018/0073932 A1* | 3/2018 | Minet ................ G01J 9/04 |
| 2018/0080770 A1* | 3/2018 | Chamoun .......... G01C 19/66 |
| 2019/0056484 A1* | 2/2019 | Bradley ............. G01S 17/42 |
| 2019/0086518 A1* | 3/2019 | Hallstig ............ G01S 7/4815 |
| 2019/0154835 A1 | 5/2019 | Maleki et al. |
| 2019/0265351 A1 | 8/2019 | Madison et al. |
| 2019/0317219 A1 | 10/2019 | Smith et al. |
| 2019/0377089 A1* | 12/2019 | Rohner ............. G01S 7/4911 |
| 2020/0072979 A1 | 3/2020 | Boloorian et al. |
| 2021/0311192 A1* | 10/2021 | Chakrabarty ...... G01S 17/931 |
| 2021/0311194 A1 | 10/2021 | Boloorian |
| 2021/0341611 A1 | 11/2021 | Boloorian |

FOREIGN PATENT DOCUMENTS

| | | |
|---|---|---|
| WO | 2020037167 A1 | 2/2020 |
| WO | 2020076402 A1 | 4/2020 |
| WO | 2021131315 A1 | 7/2021 |

OTHER PUBLICATIONS

Behroozpour, Behnam et al., "Electronic-Photonic Integrated Circuit for 3D Microimaging", IEEE Journal of Solid-State Circuits, IEEE, USA vol. 52., No. 1, Jan. 1, 2017.

International Searching Authority, Patent Cooperation Treaty, International Application No. PCT/US2021/048923, Notification Date: Nov. 23, 2021, 7 pages.

International Searching Authority, Patent Cooperation Treaty, Written Opinion of the International Searching Authority, International Application No. PCT/US2021/048923, Notification Date: Nov. 23, 2021 9 pages.

Non-Final Office Action, U.S. Appl. No. 17/463,263, Notification Date: Nov. 1, 2021, 16 pages.

Non-Final Office Action, U.S. Appl. No. 17/463,336, Notification Date: Nov. 18, 2021, 8 pages.

\* cited by examiner

LIDAR WAVEFORM GENERATION SYSTEM

CROSS-REFERENCE TO RELATED APPLICATIONS

This application claims priority to U.S. Provisional Application No. 63/074,832 filed Sep. 4, 2020, which is hereby incorporated by reference.

TECHNICAL FIELD

This disclosure relates generally to light detection and ranging (LIDAR).

BACKGROUND INFORMATION

Frequency modulated continuous wave (FMCW) LIDAR directly measures range and velocity of an object by directing a frequency modulated, collimated light beam at a target. Both range and velocity information of the target can be derived from FMCW LIDAR signals. Designs and techniques to increase the accuracy of LIDAR signals are desirable.

The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment. Autonomous vehicles may include one or more FMCW LIDAR devices for sensing its environment.

BRIEF SUMMARY OF THE INVENTION

Implementations of the disclosure include a light detection and ranging (LIDAR) system including a LIDAR measurement unit, a reference measurement unit, and a phase cancellation unit. The LIDAR measurement unit is configured to estimate a time for which a laser beam travels between a laser source and a target. The reference measurement unit is configured to determine a phase of the laser source. The phase cancellation unit is configured to cancel phase noise from a signal representing the laser beam, at least partially based on the phase of the laser source and the time for which the laser beam travels.

In an implementation, the LIDAR system further includes a free-space interferometer and a fixed-length interferometer. The signal representing the laser beam is a first beat signal received from the free-space interferometer. The phase of the laser source is calculated from a second beat signal received from the fixed-length interferometer. The laser source concurrently feeds the free-space interferometer and the fixed-length interferometer.

In an implementation, the free-space interferometer combines a first local oscillator signal with a target-reflected signal to generate the first beat signal, and the fixed-length interferometer combines a second local oscillator signal with a fixed-length signal that is delayed by a fixed-length optical delay line to generate the second beat signal.

In an implementation, the phase cancellation unit generates a delayed phase of the laser source with a delay operation that is configured to delay the phase of the laser source by the time for which the laser beam travels estimated by the LIDAR measurement unit.

In an implementation, the phase cancellation unit subtracts the delayed phase of the laser source from the phase of the laser source to generate a delta phase of the laser source. The delta phase of the laser source represents the phase noise within the signal representing the laser beam.

In an implementation, the phase cancellation unit multiplies a complex conjugate of the delta phase with the signal representing the laser beam to cancel the phase noise.

In an implementation, the LIDAR system further includes a range calculation unit configured to calculate a range between the laser source and the target from a denoised signal that is the signal representing the laser beam after cancellation of the phase noise.

In an implementation, the range calculation unit determines a frequency of the denoised signal, and the frequency of the denoised signal is determined based on peak amplitudes of a frequency representation of the denoised signal.

In an implementation, the LIDAR system is a frequency modulated continuous wave (FMCW) LIDAR system.

In an implementation, the reference measurement unit determines the phase of the laser source at least partially based on an in-phase signal and a quadrature signal from a fixed-length interferometer.

In an implementation, to determine the phase of the laser source, the reference measurement unit is configured to apply an arctangent operation to the quadrature signal divided by the in-phase signal and is configured to apply an integration operation to output from the arctangent operation.

In an implementation, to estimate the time for which the laser beam travels, the LIDAR measurement unit is configured to determine a frequency of a beat signal from a free-space interferometer, and the frequency of the beat signal is determined based on at least one peak amplitude of a frequency representation of the beat signal.

An implementation of the disclosure includes an autonomous vehicle control system including a light detection and ranging (LIDAR) system. The LIDAR system includes a LIDAR measurement unit, a reference measurement unit, and a phase cancellation unit. The LIDAR measurement unit is configured to estimate a time for which a laser beam travels between a laser source and a target. The reference measurement unit is configured to determine a phase of the laser source. The phase cancellation unit is configured to cancel phase noise from a signal representing the laser beam, at least partially based on the phase of the laser source and the time for which the laser beam travels. The control system for the autonomous vehicle includes one or more processors to control the autonomous vehicle control system in response to signals output by the phase cancellation unit.

In an implementation, the LIDAR system further includes a free-space interferometer a fixed-length interferometer. The signal representing the laser beam is a first beat signal received from the free-space interferometer. The phase of the laser source is calculated from a second beat signal received from the fixed-length interferometer. The laser source concurrently feeds the free-space interferometer and the fixed-length interferometer.

In an implementation, the phase cancellation unit is configured to generate a delayed phase of the laser source with a delay operation that is configured to delay the phase of the laser source by the time for which the laser beam travels estimated by the LIDAR measurement unit.

In an implementation, the phase cancellation unit subtracts the delayed phase of the laser source from the phase of the laser source to generate a delta phase of the laser source. The delta phase of the laser source represents the phase noise within the signal representing the laser beam. The phase cancellation unit is configured to multiply a complex conjugate of the delta phase with the signal representing the laser beam to cancel the phase noise.

An implementation of the disclosure includes an autonomous vehicle system for an autonomous vehicle including a light detection and ranging (LIDAR) system. The LIDAR system includes a LIDAR measurement unit, a reference measurement unit, and a phase cancellation unit. The LIDAR measurement unit is configured to estimate a time for which a laser beam travels between a laser source and a target. The reference measurement unit is configured to determine a phase of the laser source. The phase cancellation unit is configured to cancel phase noise from a signal representing the laser beam, at least partially based on the phase of the laser source and the time for which the laser beam travels. The autonomous vehicle includes one or more processors to control the autonomous vehicle in response to signals output by the phase cancellation unit.

In an implementation, the LIDAR system further includes a free-space interferometer and a fixed-length interferometer. The signal representing the laser beam is a first beat signal received from the free-space interferometer. The phase of the laser source is calculated from a second beat signal received from the fixed-length interferometer. The laser source concurrently feeds the free-space interferometer and the fixed-length interferometer.

In an implementation, the phase cancellation unit is configured to generate a delayed phase of the laser source with a delay operation that is configured to delay the phase of the laser source by the time for which the laser beam travels estimated by the LIDAR measurement unit.

In an implementation, the phase cancellation unit is configured to subtract the delayed phase of the laser source from the phase of the laser source to generate a delta phase of the laser source. The delta phase of the laser source represents the phase noise within the signal representing the laser beam. The phase cancellation unit is configured to multiply a complex conjugate of the delta phase with the signal representing the laser beam to cancel the phase noise.

Implementations of the disclosure include a light detection and ranging (LIDAR) system including a laser waveform function, a set of parameters, and a calibration unit. The laser waveform function defines a laser waveform. The set of parameters at least partially define the laser waveform. The calibration unit is configured to estimate a partial derivative of a frequency response with respect to each parameter in the set of parameters. The frequency response is measured from an output of a laser driven by the laser waveform. The calibration unit is configured to update the set of parameters to cause the frequency response of the laser to satisfy conditions defined by the laser waveform function.

In an implementation, the LIDAR system further includes a fixed-length interferometer. The calibration unit is configured to receive an in-phase signal and a quadrature signal from the fixed-length interferometer. The calibration unit is configured to determine a frequency response of the laser based on the in-phase signal and the quadrature signal.

In an implementation, the calibration unit is configured to iteratively construct the laser waveform based the laser waveform function and the set of parameters. The set of parameters includes an initial version of the set of parameters that is superseded by one or more updated versions of the set of parameters.

In an implementation, the calibration unit is configured to iteratively evaluate the frequency response of the laser with updated versions of the set of parameters.

In an implementation, to iteratively evaluate the frequency response of the laser, the calibration unit is configured to load the laser waveform into a digital to analog converter, wait for the laser to settle, measure an output from an interferometer, and calculate the frequency response from the output from the interferometer.

In an implementation, the calibration unit is configured to estimate a gradient of the laser waveform function.

In an implementation, to estimate the gradient of the laser waveform function, the calibration unit is configured to calculate a perturbed version of the laser waveform, load the perturbed version of the laser waveform into a digital to analog converter, measure the output from the laser, and evaluate a perturbed version of the laser waveform function.

In an implementation, the perturbed version of the laser waveform includes a difference between a first parameter in the set of parameters and a second parameter in the set of parameters.

In an implementation, the calibration unit is configured to update the set of parameters based on the partial derivative of the frequency response with respect to each parameter in the set of parameters.

In an implementation, the calibration unit is configured to update the set of parameters to compensate for distortion characteristics of the laser.

An implementation of the disclosure includes an autonomous vehicle control system including a light detection and ranging (LIDAR) system. The LIDAR system includes a laser waveform function to define a laser waveform, a set of parameters that at least partially define the laser waveform, and a calibration unit configured to estimate a partial derivative of a frequency response with respect to each parameter in the set of parameters. The frequency response is measured from an output of a laser driven by the laser waveform. The calibration unit is configured to update the set of parameters to cause the frequency response of the laser to satisfy conditions defined by the laser waveform function. The autonomous vehicle control system includes one or more processors to control the autonomous vehicle control system in response to the laser waveform at least partially defined by the calibration unit.

In an implementation, the autonomous vehicle control system further includes a fixed-length interferometer. The calibration unit is configured to receive an in-phase signal and a quadrature signal from the fixed-length interferometer. The calibration unit is configured to determine a frequency response of the laser based on the in-phase signal and the quadrature signal.

In an implementation, the calibration unit is configured to iteratively construct the laser waveform based the laser waveform function and the set of parameters. The set of parameters includes an initial version of the set of parameters that is superseded by one or more updated versions of the set of parameters.

In an implementation, the calibration unit is configured to iteratively evaluate the frequency response of the laser with updated versions of the set of parameters.

In an implementation, to iteratively evaluate the frequency response of the laser, the calibration unit is configured to load the laser waveform into a digital to analog converter, wait for the laser to settle, measure an output from an interferometer, and calculate the frequency response from the output from the interferometer.

In an implementation, the calibration unit is configured to estimate a gradient of the laser waveform function.

In an implementation, to estimate the gradient of the laser waveform function, the calibration unit is configured to calculate a perturbed version of the laser waveform, load the perturbed version of the laser waveform into a digital to analog converter, measure the output from the laser, and evaluate a perturbed version of the laser waveform function.

In an implementation, an autonomous vehicle includes a light detection and ranging (LIDAR) system. The LIDAR system includes a laser waveform function to define a laser waveform, a set of parameters that at least partially define the laser waveform, and a calibration unit configured to estimate a partial derivative of a frequency response with respect to each parameter in the set of parameters. The frequency response is measured from an output of a laser driven by the laser waveform. The calibration unit is configured to update the set of parameters to cause the frequency response of the laser to satisfy conditions defined by the laser waveform function. The autonomous vehicle includes one or more processors to control the autonomous vehicle in response to the laser waveform at least partially defined by the calibration unit.

In an implementation, the calibration unit is configured to iteratively evaluate the frequency response of the laser with updated versions of the set of parameters.

In an implementation, the calibration unit is configured to estimate a gradient of the laser waveform function.

Implementations of the disclosure include a light detection and ranging (LIDAR) system including a reference measurement unit and a LIDAR measurement unit. The reference measurement unit is configured to determine a phase of a reference beat signal from a fixed-length interferometer driven by a laser source. The LIDAR measurement unit is configured to range multiple targets at least partially based on first frequency spectrum peaks from an upward frequency chirp of the laser source paired to second frequency spectrum peaks from a downward frequency chirp of the laser source. The LIDAR measurement unit is configured to range the multiple targets at least partially based on the phase of the reference beat signal.

In an implementation, the LIDAR measurement unit is configured to estimate a travel time of a free-space laser signal to the multiple targets using sequentially paired peaks between the first frequency spectrum peaks and the second frequency spectrum peaks. A first peak pair includes a first of the first frequency spectrum peaks and a first of the second frequency spectrum peaks.

In an implementation, the LIDAR measurement unit is configured to iteratively range the multiple targets. Each of the multiple targets is associated with a travel time estimate determined from a peak pair of one of the first frequency spectrum peaks and one of the second frequency spectrum peaks.

In an implementation, the LIDAR measurement unit is configured to delay the phase of the reference beat signal by a duration that is equal to a travel time estimate to identify phase noise of the laser source.

In an implementation, the LIDAR measurement unit is configured to multiply a complex conjugate of the phase noise with a free-space beat signal to cancel the phase noise in the free-space beat signal to generate a denoised free-space beat signal.

In an implementation, the LIDAR measurement unit is configured to cancel phase noise that occurs during the upward frequency chirp. The reference measurement unit is configured to cancel phase noise that occurs during the downward frequency chirp.

In an implementation, the first frequency spectrum peaks are generated from a first beat signal from a free-space interferometer. The second frequency spectrum peaks are generated from a second beat signal from the free-space interferometer.

In an implementation, the free-space interferometer combines a first local oscillator signal with a first target-reflected signal to generate the first beat signal from the upward frequency chirp. The free-space interferometer combines a second local oscillator signal with a second target-reflected signal to generate the second beat signal from the downward frequency chirp.

In an implementation, the LIDAR system is a frequency modulated continuous wave (FMCW) LIDAR system.

In an implementation, the reference measurement unit determines the phase of the reference beat signal at least partially based on an in-phase signal and a quadrature signal from the fixed-length interferometer.

In an implementation, to determine the phase of the reference beat signal, the reference measurement unit is configured to apply an arctangent operation to the quadrature signal divided by the in-phase signal and is configured to apply an integration operation to output from the arctangent operation.

In an implementation, the reference beat signal is a first reference beat signal. The phase of the first reference beat signal is generated from the upward frequency chirp. The reference measurement unit is configured to estimate a phase of a second reference beat signal that is generated from the downward frequency chirp.

An implementation of the disclosure includes an autonomous vehicle control system including a light detection and ranging (LIDAR) system. The LIDAR system includes a LIDAR measurement unit and a reference measurement unit. The reference measurement unit is configured to determine a phase of a reference beat signal from a fixed-length interferometer driven by a laser source. The LIDAR measurement unit is configured to range multiple targets at least partially based on first frequency spectrum peaks from an upward frequency chirp of the laser source paired to second frequency spectrum peaks from a downward frequency chirp of the laser source. The LIDAR measurement unit is configured to range the multiple targets at least partially based on the phase of the reference beat signal. The autonomous vehicle control system includes one or more processors to control the autonomous vehicle control system in response to signals output by at least one of the LIDAR measurement unit and the reference measurement unit.

In an implementation, the LIDAR measurement unit is configured to estimate a travel time of a free-space laser signal to the multiple targets using sequentially paired peaks between the first frequency spectrum peaks and the second frequency spectrum peaks. A first peak pair includes a first of the first frequency spectrum peaks and a first of the second frequency spectrum peaks.

In an implementation, the LIDAR measurement unit is configured to iteratively range the multiple targets. Each of the multiple targets is associated with a travel time estimate determined from a peak pair of one of the first frequency spectrum peaks and one of the second frequency spectrum peaks.

In an implementation, the LIDAR measurement unit is configured to delay the phase of the reference beat signal by a duration that is equal to a travel time estimate to identify phase noise of the laser source. The LIDAR measurement unit is configured to multiply a complex conjugate of the phase noise with a free-space beat signal to cancel the phase noise in the free-space beat signal to generate a denoised free-space beat signal.

An implementation of the disclosure includes an autonomous vehicle including a light detection and ranging (LIDAR) system. The LIDAR system includes a LIDAR measurement unit and a reference measurement unit. The reference measurement unit is configured to determine a phase of a reference beat signal from a fixed-length interferometer driven by a laser source. The LIDAR measurement unit is configured to range multiple targets at least partially based on first frequency spectrum peaks from an upward frequency chirp of the laser source paired to second frequency spectrum peaks from a downward frequency chirp of the laser source. The LIDAR measurement unit is configured to range the multiple targets at least partially based on the phase of the reference beat signal. The autonomous vehicle includes one or more processors to control the autonomous vehicle in response to signals output by at least one of the LIDAR measurement unit or the reference measurement unit.

In an implementation, the LIDAR measurement unit is configured to estimate a travel time of a free-space laser signal to the multiple targets using sequentially paired peaks between the first frequency spectrum peaks and the second frequency spectrum peaks. A first peak pair includes a first of the first frequency spectrum peaks and a first of the second frequency spectrum peaks.

In an implementation, the LIDAR measurement unit is configured to iteratively range the multiple targets. Each of the multiple targets is associated with a travel time estimate determined from a peak pair of one of the first frequency spectrum peaks and one of the second frequency spectrum peaks.

In an implementation, the LIDAR measurement unit is configured to delay the phase of the reference beat signal by a duration that is equal to a travel time estimate to identify phase noise of the laser source. The LIDAR measurement unit is configured to multiply a complex conjugate of the phase noise with a free-space beat signal to cancel the phase noise in the free-space beat signal to generate a denoised free-space beat signal.

BRIEF DESCRIPTION OF THE DRAWINGS

Non-limiting and non-exhaustive implementations of the invention are described with reference to the following figures, wherein like reference numerals refer to like parts throughout the various views unless otherwise specified.

DETAILED DESCRIPTION

Figure 1:
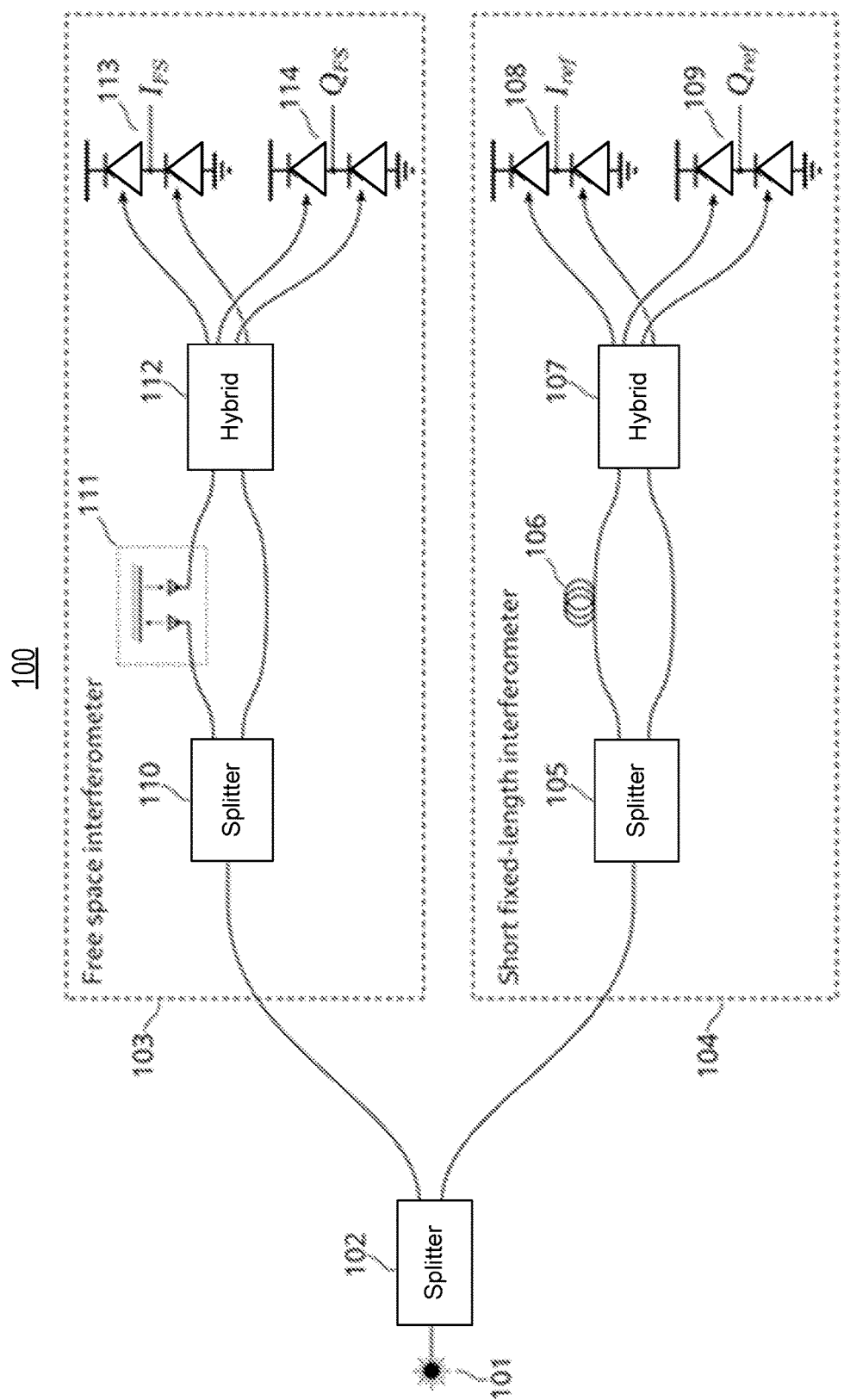
FIG. 1 illustrates an optical measurement apparatus that supports phase estimation, active phase cancellation, predistortion waveform generation, and peak pairing in a LIDAR system, in accordance with implementations of the disclosure.

Implementations of phase estimation, active phase cancellation, predistortion waveform generation, and peak pairing for light detection and ranging (LIDAR) systems are described herein. In the following description, numerous specific details are set forth to provide a thorough understanding of the implementations. One skilled in the relevant art will recognize, however, that the techniques described herein can be practiced without one or more of the specific details, or with other methods, components, or materials. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 µm.

In aspects of this disclosure, the term "transparent" may be defined as having greater than 90% transmission of light. In some implementations, the term "transparent" may be defined as a material having greater than 90% transmission of visible light.

A coherent LIDAR system directly measures range and velocity of an object by directing a modulated, collimated light beam at the object. The light that is reflected from the object is combined with a tapped version of the beam. The frequency of the resulting beat tone is proportional to the distance of the object from the LIDAR system, once corrected for the doppler shift, which may use a second measurement. The two measurements, which may or may not be performed at the same time, provide both range and velocity information. In this application, frequency modulated continuous wave (FMCW) LIDAR is described as one example of a coherent LIDAR. However, the implementations and examples described in this application can be applied to any type of coherent LIDAR.

In some implementations, FMCW LIDAR, which is a type of a coherent LIDAR, can be used. In particular, FMCW LIDAR modulates a frequency of a light beam from a laser source. FMCW LIDAR can take advantage of integrated photonics for improved manufacturability and performance. Integrated photonic systems may manipulate single optical modes using micron-scale waveguiding devices.

Integrated FMCW LIDAR systems rely on one or more laser sources, which provide optical power to the system. The optical field produced by such lasers typically exhibits deterministic and stochastic phase fluctuations which can result in broadening of the returning FMCW beat signal and thus compromise the system's performance.

FMCW LIDAR systems emit light which can reflect off of more than one object in a scene before returning to the unit. These multiple returns result in a beat signal with a spectrum having multiple peaks. In order to determine the distance and velocity of each of these returns, two measurements of the beat signal can be performed. In order to correctly determine the multiple distances and velocities, the peaks in the two spectra are correctly paired.

FMCW LIDAR systems use a linear frequency chirp in order to achieve good performance. This linear frequency chirp can be achieved by driving the laser with a laser drive waveform. To compensate for distortion characteristics of a laser, the laser drive waveform may be defined to compensate for the characteristics of the transmitting laser. As the system ages, the linearity of the frequency chirp may degrade. Some implementations of the disclosure provide for in situ recalibration of the laser drive waveform to support system degradation or changes.

A system is described for directly measuring the frequency excursion of a laser in an integrated FMCW LIDAR system. Measured frequency excursion can be integrated to determine the phase optical signal produced by the laser.

The system comprises a short (fixed-length) integrated interferometer that is connected or coupled in parallel to a main free-space interferometer that at least partially defines the FMCW LIDAR system. A single laser source feeds both interferometers.

Using an initial estimate of target range from the main free-space interferometer, undesired optical phase fluctuations (phase noise) in the beat signal can be estimated and subtracted from the beat signal, thus improving the measurement capabilities of the main free-space interferometer.

The estimated beat signal phase can additionally be used to correctly pair spectral peaks when multiple returns (multiple targets) are present.

The measured frequency excursion can equally be used for in-situ generation and calibration of predistortion waveforms to improve the linearity of the laser frequency chirp.

The systems and methods for identifying and canceling optical phase fluctuations ("phase noise"), for identifying multiple targets, and for generating predistortion waveforms described in this disclosure may (collectively or individually) be used to support autonomous operation of a vehicle. These and other implementations are described in more detail in connection with FIGS. 1-7C.

FIG. 1 illustrates an optical phase measurement apparatus 100 that supports phase estimation, active phase cancellation, predistortion waveform generation, and peak pairing in an FMCW LIDAR system, in accordance with implementations of the disclosure. Optical phase measurement apparatus 100 includes a laser source 101, a splitter 102, a free-space interferometer 103, and a fixed-length interferometer 104 to support phase estimation, phase noise cancellation, predistortion waveform generation, and peak pairing in a LIDAR system.

Light emitted by laser source 101 enters splitter 102 which splits the optical power of laser source 101 into two separate optical channels. The split ratio achieved by splitter 102 may be equal (50:50) or some other ratio (e.g., 80:20). In practice, the majority of the optical power is split and routed to free-space interferometer 103, while the remaining small portion of the optical power is routed to fixed-length interferometer 104.

Fixed-length interferometer 104 is configured to measure or approximate the instantaneous laser frequency of laser source 101. Fixed-length interferometer 104 may include a splitter 105, a fixed-length optical delay line 106, an optical hybrid 107, a balanced photodiode pair 108, and a balanced photodiode pair 109. Fixed-length interferometer 104 may incorporate a short optical delay in fixed-length optical delay line 106, e.g., in the range of 10 cm-30 cm. Fixed-length interferometer 104 may therefore be referred to as a short fixed-length interferometer or as a reference interferometer.

Light entering fixed-length interferometer 104 passes through splitter 105, which can have an equal or unequal split ratio. The top output of splitter 105 is connected to fixed-length optical delay line 106. Fixed-length optical delay line 106 delays the optical signal by a short amount of time compared to light leaving the bottom output of splitter 105. These two optical paths (i.e., the top optical path and the bottom optical path) are connected to optical hybrid 107, which may be implemented as a 2×4 optical hybrid. Optical hybrid 107 mixes the bottom signal with the top signal that is delayed through fixed-length optical delay line 106. Because laser source 101 may be driven to output a time-based linearly changing frequency (i.e., chirped), the frequency of the top signal that arrives at optical hybrid 107 is slightly different (e.g., faster or slower) than the frequency of the bottom signal that arrives at optical hybrid 107. When signals of different frequencies are mixed or combined, they produce a beat tone or beat signal that has a beat frequency that is equal to the difference of the two frequencies.

The beat signals from optical hybrid 107 are measured and converted to electrical signals using balanced photodiode pair 108 and balanced photodiode pair 109. Balanced photodiode pair 108 produces an electrical signal that corresponds to an in-phase signal $I_{ref}$ while balanced photodiode pair 109 produces an electrical signal that corresponds to a quadrature signal $Q_{ref}$. For a sufficiently short (e.g., 20 cm) implementation of fixed-length optical delay line 106, the phase of in-phase signal $I_{ref}$ and quadrature signal $Q_{ref}$ measurements is proportional to an instantaneous frequency of laser source 101. The instantaneous frequency of laser source 101 can be integrated in order to calculate the instantaneous phase of laser source 101. The instantaneous phase of laser source 101 may be used to isolate phase noise of laser source 101, which may be defined by deterministic and stochastic phase fluctuations.

Free-space interferometer 103 is configured to measure or estimate the distance between laser source 101 and a target. Free-space interferometer 103 may include a splitter 110, a variable-distance optical delay line 111, an optical hybrid 112, a balanced photodiode pair 113, and a balanced photodiode pair 114.

Light entering free-space interferometer 103 enters into splitter 110. Splitter 110 separates the "local oscillator" field (i.e., the illustrated bottom path, "bottom signal", and/or "local oscillator signal") from the "signal" field (i.e., the illustrated top path, "top signal", and/or "delayed signal"). The top signal power is coupled into free space. This light propagates over different or variable distances before striking a target and reflecting back towards the LIDAR unit (e.g., free-space interferometer 103). This light is received by free-space interferometer 103, effectively forming variable-distance optical delay line 111. The delayed signal and local oscillator signal are mixed together by optical hybrid 112. The outputs of optical hybrid 112 are converted to electrical signals using balanced photodiode pair 113 and balanced photodiode pair 114. The resulting electrical signals correspond to the in-phase signal $I_{FS}$ and quadrature signal $Q_{FS}$, which are components of the FMCW LIDAR beat signal, respectively. The phase fluctuations in this measured beat signal are time correlated to those in the beat signal measured by fixed-length interferometer 104, since the interferometers are concurrently fed by laser source 101.

Figure 2:
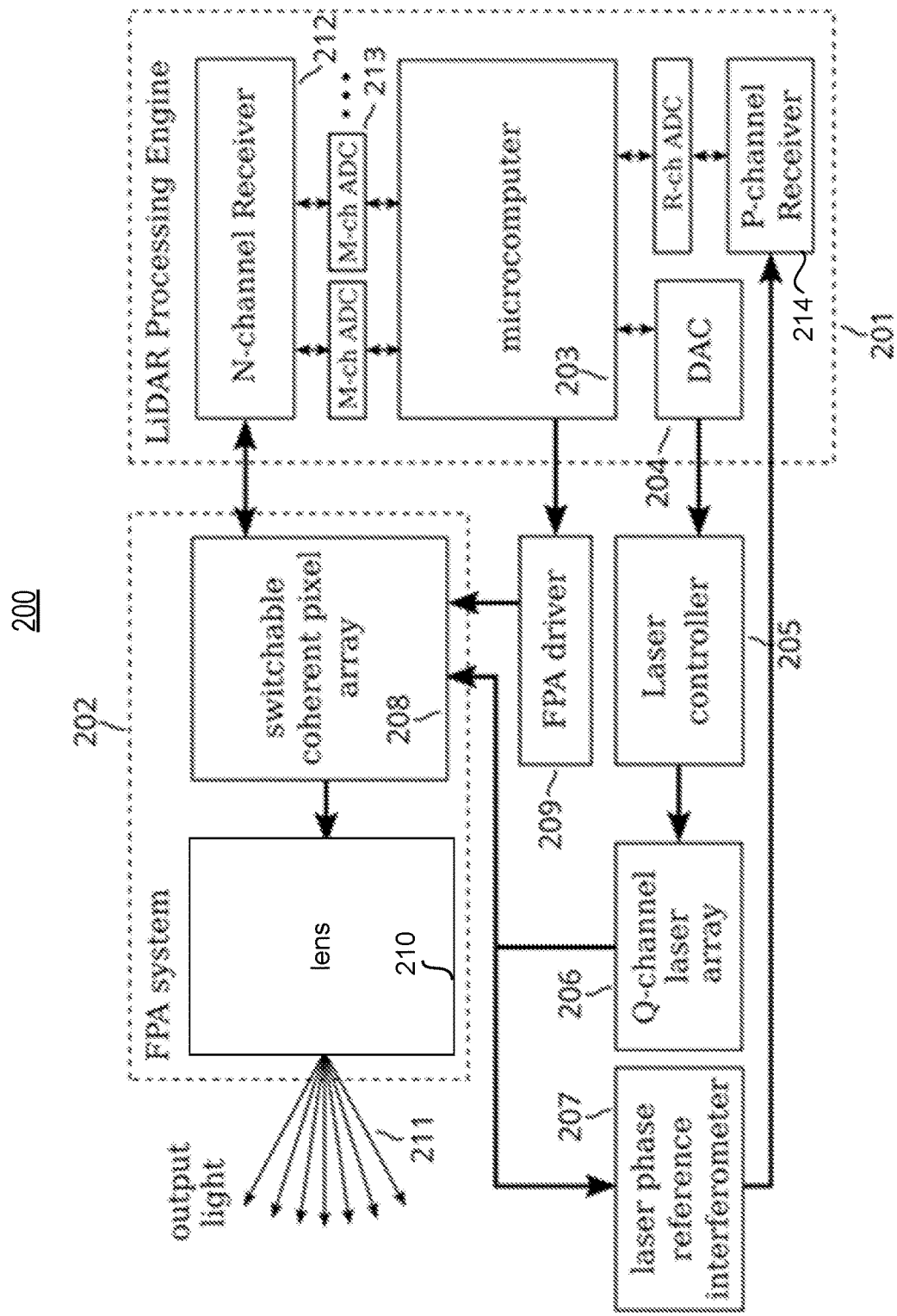
FIG. 2 illustrates a LIDAR system that may incorporate phase estimation, active phase cancellation, predistortion waveform generation, and peak pairing, in accordance with implementations of the disclosure.

FIG. 2 illustrates an example of an FMCW LIDAR system 200, which may be configured to incorporate phase estimation, active phase cancellation, predistortion waveform generation, and peak pairing, in accordance with implementations of the disclosure. FMCW LIDAR system 200 includes a LIDAR processing engine 201 and a focal plane array (FPA) system 202. In other implementations, a different form of beam steering may be used.

LIDAR processing engine 201 includes a microcomputer 203 configured to drive a digital-to-analog converter (DAC) 204, which generates a modulation signal for a laser controller 205. Laser controller 205 modulates the frequency of a Q-channel laser array 206. The optical power emitted by laser array 206 is split and routed to a switchable coherent pixel array 208 and to a laser phase reference interferometer 207 (which may include fixed-length interferometer 104 of FIG. 1). Light entering switchable coherent pixel array 208 is controlled by an FPA driver 209. Light emitted from different locations in switchable coherent pixel array 208 is collimated at different angles by lens 210 and is emitted into free space 211.

The light emitted into free space 211 reflects off of targets, propagates back through lens 210, and is coupled back into switchable coherent pixel array 208. The received light is measured using an N-channel receiver 212, which may incorporate optical hybrid 107 and/or optical hybrid 112 (shown in FIG. 1). The resulting electrical currents are digitized using one or more M-channel analog-to-digital converters (ADC) 213, and those signals are processed by the microcomputer 203.

In parallel with the free-space measurements, the optical field passing through laser phase reference interferometer 207 is measured using the P-channel receiver 214, which produces electrical currents that are converted to a digital signal using the R-channel analog-to-digital converter (ADC) 215. This resulting digital signal is processed by the microcomputer 203 in order to estimate the phase fluctuation (phase noise) of the laser. The estimated or determined phase noise can subsequently be used to cancel the phase noise from ("denoise") the free-space range measurement signals.

Figure 3A:
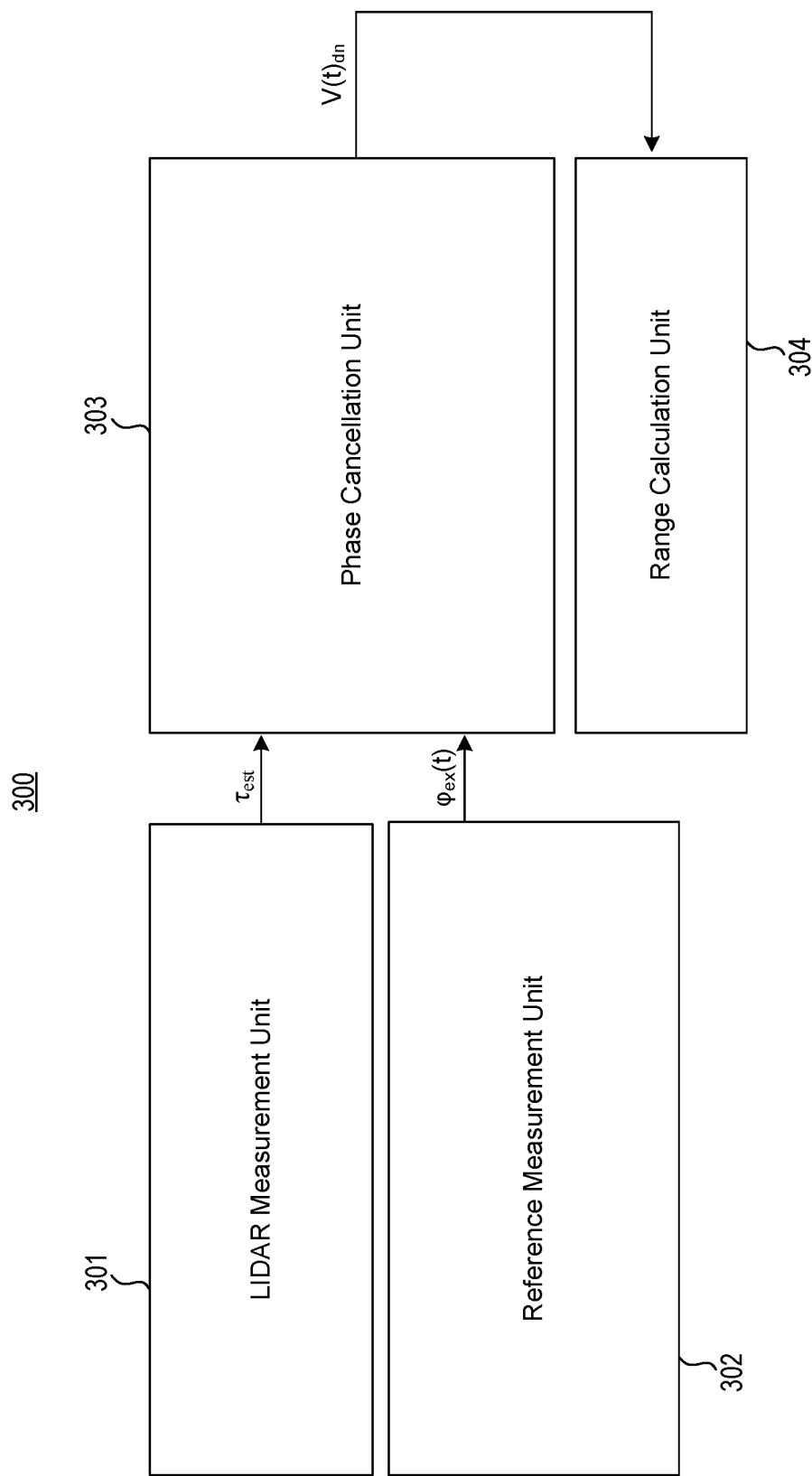
FIGS. 3A and 3B illustrate example phase noise cancellation systems, in accordance with implementations of the disclosure.
Figure 3B:
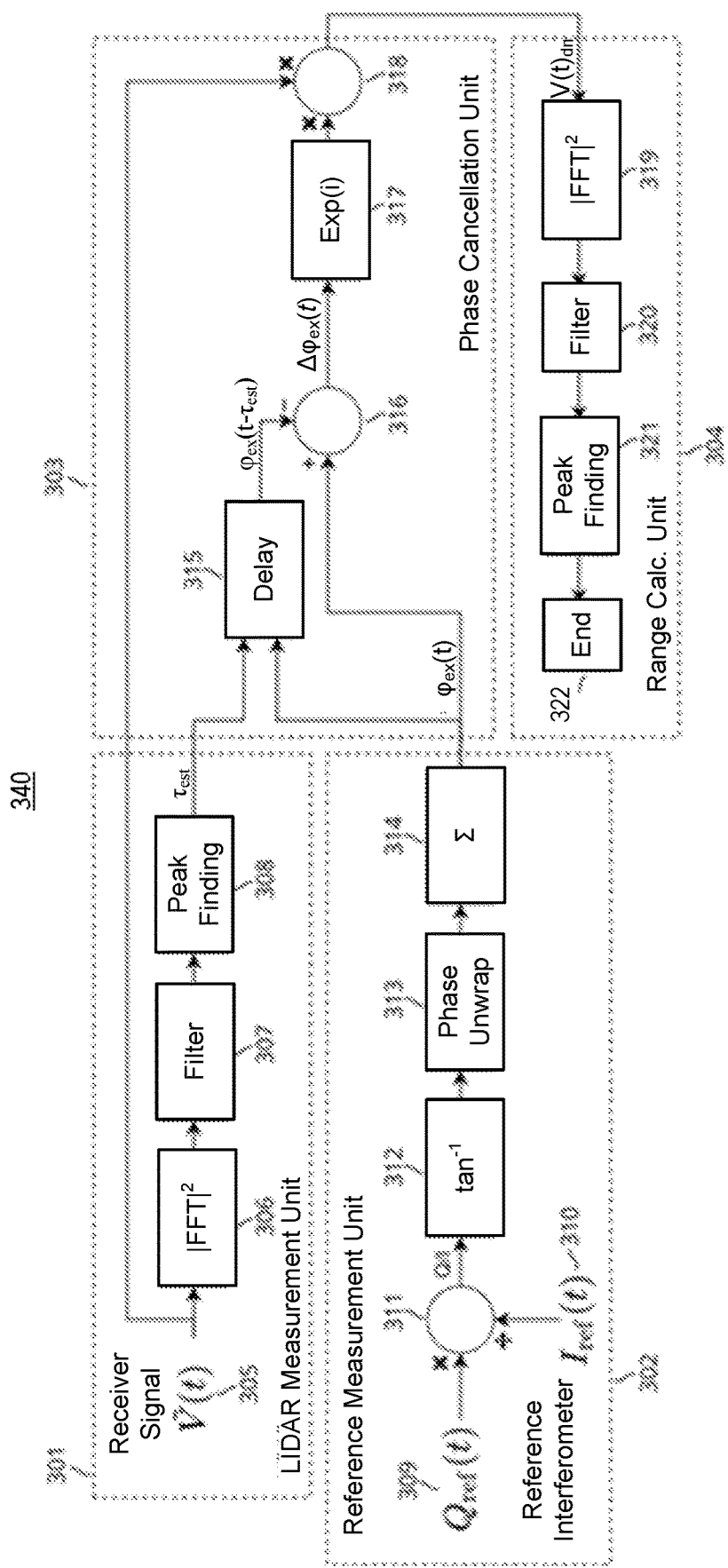

FIGS. 3A and 3B illustrate example phase noise cancellation systems by which optical phase measurement apparatus 100 (shown in FIG. 1) and FMCW LIDAR system 200 (shown in FIG. 2) can be used to actively cancel unwanted phase fluctuations ("phase noise") to support FMCW LIDAR range and velocity measurements, in accordance with implementations of the disclosure.

FIG. 3A illustrates a phase noise cancellation system 300, in accordance with implementations of the disclosure. Phase noise cancellation system 300 may include a LIDAR measurement unit 301, a reference measurement unit 302, a phase cancellation unit 303, and a range calculation unit 304. LIDAR measurement unit 301 may be configured to perform an FMCW range measurement by estimating time for which light travels (i.e., travel time) between a light source and a target. In this application, the time for which light travels between a light source (e.g., a laser source) and a target (e.g., an object in an environment at which a LIDAR system is located) is defined as a time-of-flight. Concurrently, reference measurement unit 302 may be configured to determine an estimation of the phase of the light (e.g., laser light) by using a reference or fixed-length interferometer. The time-of-flight estimate Test from LIDAR measurement unit 301 and the phase of the light $\varphi_{ex}(t)$ from reference measurement unit 302 are provided to phase cancellation unit 303. Phase cancellation unit 303 uses time-of-flight estimate Test and phase of the light $\varphi_{ex}(t)$ to estimate and cancel phase noise from a signal representing the light (e.g., in-phase signal $I_{FS}$ and/or quadrature signal $Q_{FS}$). Phase cancellation unit 303 outputs a denoised signal $V(t)_{dn}$ that is used by range calculation unit 304 to estimate a range to a target range. Range calculation unit 304 may also be configured to calculate velocity of a target by, for example, performing doppler shift calculations or measurements.

FIG. 3B illustrates an example of a phase noise cancellation system 340, in accordance with implementations of the disclosure. Phase noise cancellation system 340 is an example implementation of phase noise cancellation system 300. One or more components or operations within phase noise cancellation system 340 may be implemented in a photonic integrated circuit and/or FMCW LIDAR system.

LIDAR measurement unit 301 is configured to receive a signal 305 (e.g., a voltage signal) and generate time-of-flight estimate Test. Signal 305 is a signal that represents light that has traveled in free space to and from at least one target. Signal 305 may be a beat signal that is a combination of a local oscillator signal with a free-space light signal. Signal 305 may include in-phase signal $I_{FS}$ and/or quadrature signal $Q_{FS}$ and may be received from free-space interferometer 103 (shown in FIG. 1).

LIDAR measurement unit 301 includes a frequency conversion block 306, a filter block 307, and a peak finding block 308. Frequency conversion block 306 converts signal 305 into a frequency representation of signal 305. LIDAR measurement unit 301 may use a Fourier transform (e.g., a fast Fourier transform (FFT)) to perform this operation. Frequency conversion block 306 may digitize signal 305 and may use the Fourier transform to calculate the power spectral density (PSD) of signal 305. Filter block 307 filters the output of frequency conversion block 306 to improve signal-to-noise ratio. Peak finding block 308 may identify the tallest peak in the filtered frequency spectrum of signal 305. Based on system parameters, this peak location can be converted to an estimate of time-of-flight $\tau_{est}$ of the optical signal.

Concurrently with operation of LIDAR measurement unit 301, reference measurement unit 302 is configured to determine phase of the light $\varphi_{ex}(t)$. Reference measurement unit 302 may include a divide block 311, an arctangent block 312, a phase unwrap block 313, and an integration block 314. Reference measurement unit 302 receives in-phase signal 310 and quadrature signal 309 as inputs from a fixed-length interferometer. In-phase signal 310 and quadrature signal 309 are in-phase signal $I_{ref}$ and quadrature signal $Q_{ref}$ from fixed-length interferometer 104, in one implementation. Divide block 311 includes dividing quadrature signal 309 by in-phase signal 310. Arctangent block 312 performs the arctangent of the output of divide block 311 in order to estimate the phase of the beat signal represented by at least one of in-phase signal 310 and/or quadrature signal 309. Phase unwrap block 313 applies phase unwrapping to the output of arctangent block 312. The output of phase unwrap block 313 is integrated (with respect to time) at integration block 314 in order to estimate the phase fluctuations of the system's laser with respect to time.

Phase cancellation unit 303 is configured to cancel phase noise from signal 305, at least partially based on phase of the light $\varphi_{ex}$ and time-of-flight $\tau_{est}$. Phase cancellation unit 303 includes a delay block 315, a subtraction block 316, an exponent block 317, and multiplication block 318. Delay block 315 generates delayed phase $\varphi_{ex}(t-\tau_{est})$, which is a time-delayed estimate of phase of the light $\varphi_{ex}$. The delay may be a digital delay, and the duration of the delay is the duration of time-of-flight Test. By delaying phase of the light $\varphi_{ex}(t)$ by the duration of time-of-flight Test, phase cancellation unit 303 identifies a portion of phase of the light $\varphi_{ex}(t)$ that is associated with the light transmission that defines signal 305. Subtract block 316 subtracts phase of the light $\varphi_{ex}(t)$ from delayed phase $\varphi_{ex}(t-\tau_{est})$ to isolate a delta phase $\Delta\varphi_{ex}(\tau_{est})$ that defines phase fluctuations or phase noise at the time the laser source transmitted signal 305. Exponent block 317 constructs conjugate phasor from delta phase $\leftarrow\varphi_{ex}(\tau_{est})$. Multiplication block 318 multiples the conjugate phasor by signal 305 to create denoised signal $V(t)_{dn}$. Denoised signal $V(t)_{dn}$ is signal 305 with unwanted phase fluctuations canceled out or denoised. Denoised signal $V(t)_{dn}$ is a resulting "clean" beat signal that may be passed to range calculation unit 304.

Range calculation unit 304 is configured to determine a range between a light source and a target, using denoised signal $V(t)_{dn}$. Range calculation unit 304 includes a frequency conversion block 319, a filter block 320, and a peak finding block 321. Frequency conversion block 319 converts denoised signal $V(t)_{dn}$ into a frequency representation of denoised signal $V(t)_{dn}$. Range calculation unit 304 may use a Fourier transform (e.g., a fast Fourier transform (FFT)) to perform this operation. Frequency conversion block 319 may digitize denoised signal $V(t)_{dn}$ and may use the Fourier transform to calculate the power spectral density (PSD) of denoised signal $V(t)_{dn}$. Filter block 320 filters the output of frequency conversion block 319 to improve signal-to-noise ratio. Peak finding block 321 may identify one or more peaks in the filtered frequency spectrum of denoised signal $V(t)_{dn}$. This peak information is then used to estimate the position and velocity of a target. At block 322, phase noise cancellation system 340 ends operations.

Figure 4A:
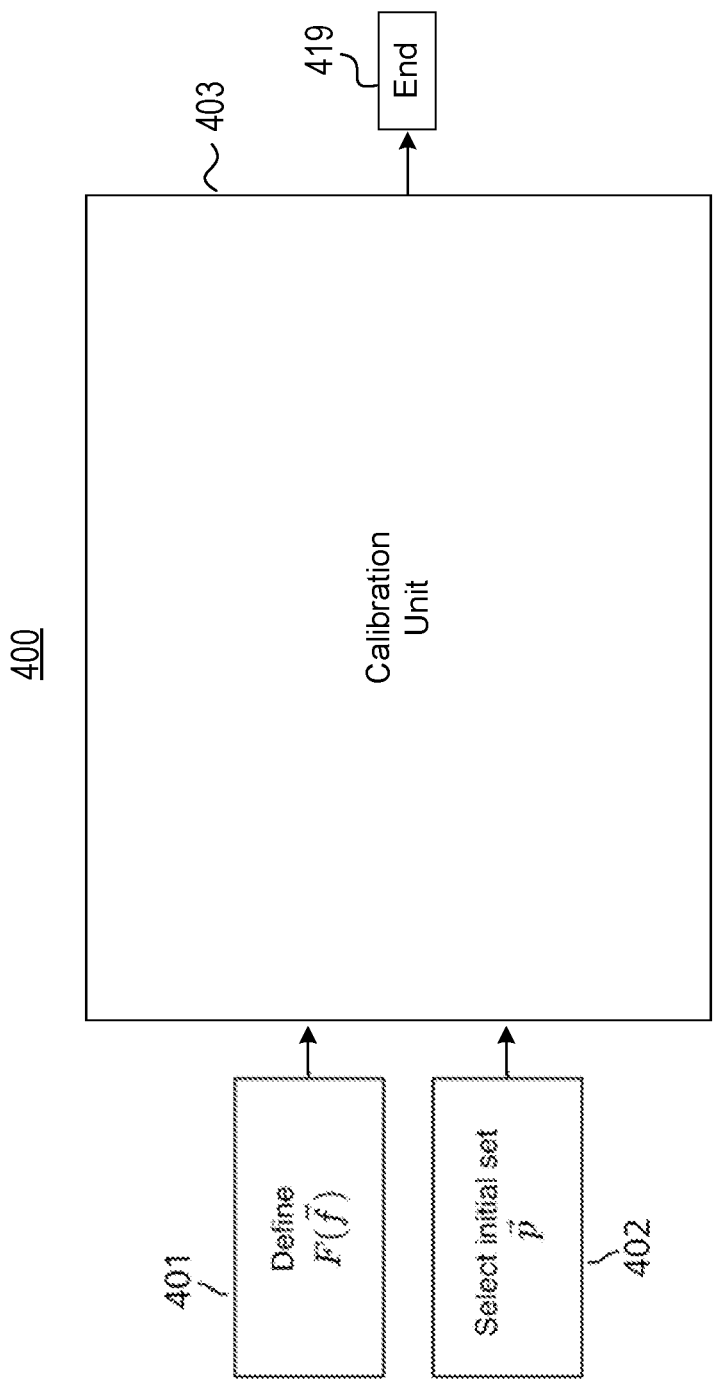
FIGS. 4A and 4B illustrate examples of predistortion waveform generators, in accordance with implementations of the disclosure.
Figure 4B:
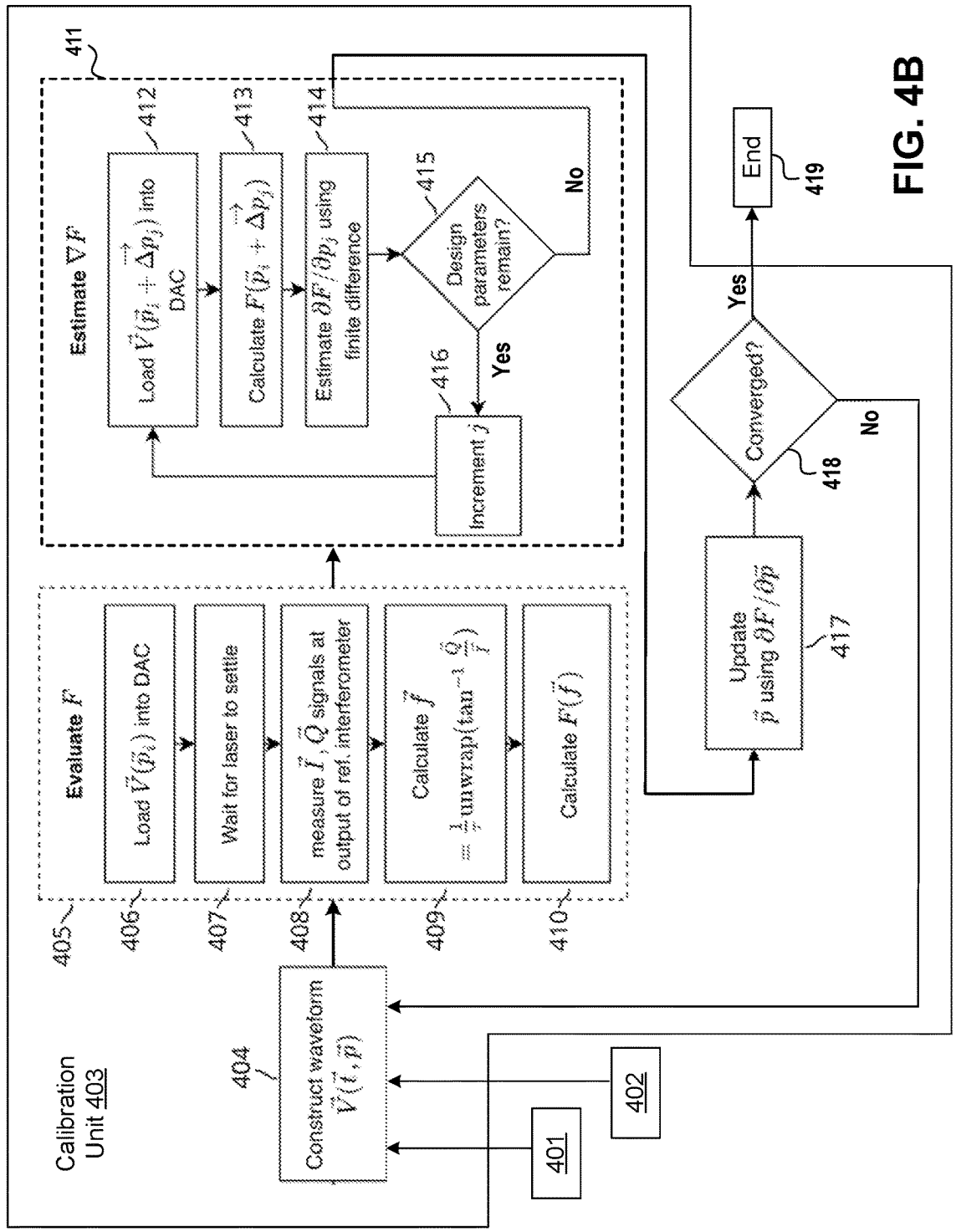

FIGS. 4A and 4B illustrate examples of predistortion waveform generators, in accordance with implementations of the disclosure. The predistortion waveform generators may use optical phase measurement apparatus 100 (shown in FIG. 1) and FMCW LIDAR system 200 (shown in FIG. 2) to generate predistortion waveforms for driving a LIDAR system laser, or to refine ("calibrate") existing predistortion waveforms. Predistortion waveform generation can be beneficial in a LIDAR system due to distortion characteristics of a laser. As an example, to linearly change a laser's frequency up and/or down, a LIDAR system may be configured to drive a laser's frequency with a waveform, such as a triangle waveform. A triangle waveform linearly increases up in value and linearly decreases down in value. However, distortion characteristics of a laser may cause the frequency response of the laser to generate an output that does not have a linearly increasing frequency and a linearly decreasing frequency. Since FMCW LIDAR systems rely on frequency modulation (e.g., chirping), such systems may benefit from a predistortion waveform that compensates for the distortion characteristics of the laser incorporated into a particular LIDAR system. An in-place or in situ adjustment, refinement, or calibration of predistortion waveforms offers the advantage of compensating for each laser's minor unique operating characteristics.

FIG. 4A illustrates a predistortion waveform generator 400, in accordance with implementations of the disclosure. Predistortion waveform generator 400 includes a function definition block 401, a parameter set block 402, and a calibration unit 403. Prior to operation of a LIDAR system, function definition block 401 defines a merit function F(f). Merit function F(f) defines or quantifies the linearity (or shape) of the chirped laser frequency that is used to drive a laser. Similarly, prior to operation of a LIDAR system, parameter set block 402 defines parameters p, which include a set of numbers that define the shape/behavior of the laser drive waveform. Merit function F(f) may explicitly be a function of the time-dependent frequency used to chirp the LIDAR laser and may explicitly or implicitly be dependent on parameters p.

Calibration unit 403 is applied to a LIDAR system in order to find parameters p that minimizes merit function F(f). Calibration unit 403 is configured to generate a predistortion waveform to compensate for distortion characteristics of a laser. Calibration unit 403 generates the predistortion waveform by applying partial derivatives to merit function F(f), with respect to each of parameters p in a set of parameters p. Through iteratively identifying distortion characteristics of a laser, calibration unit 403 redefines the set of parameters p, which are saved to define a laser drive waveform in future uses.

Predistortion waveform generator 400 ends operations at block 419.

FIG. 4B illustrates an example of a predistortion waveform generator 430, in accordance with implementations of the disclosure. Predistortion waveform generator 430 is an example implementation of predistortion waveform generator 400 (shown in FIG. 4A).

Calibration unit 403 includes a number of operations or process blocks to support predistortion waveform generation. Calibration unit 403 includes a construct waveform block 404, an evaluate function block 405, an estimate gradient block 411, and an update block 417. In construct waveform block 404, calibration unit 403 constructs an initial drive waveform V(t, p) from merit function F(f) and parameters p defined in function definition block 401 and in parameter set block 402.

Next, the value of merit function F(f) is evaluated in evaluate function block 405. Evaluate function block 405 may include several sub-operations. In block 406, the current version of drive waveform V(t, p) is loaded into a digital-to-analog converter (DAC) 406. At block 407, the laser that is driven by drive waveform V(t, p) is allowed to settle to steady-state operation. At block 408, in-phase signal $I_{ref}$ and quadrature signal $Q_{ref}$ are measured at the output of a short reference interferometer (e.g., fixed-length interferometer 104, shown in FIG. 1). At block 409, in-phase signal $I_{ref}$ and quadrature signal $Q_{ref}$ are used to compute an estimate of a time-dependent laser frequency f, for example, as described for reference measurement unit 302 of FIG. 3B. At block 409, in-phase signal $I_{ref}$ and quadrature signal $Q_{ref}$ are used to compute an estimate of time-dependent laser frequency f by dividing quadrature signal $Q_{ref}$ by in-phase signal $I_{ref}$, performing the arctangent of the division result, unwrapping the arctangent result, and dividing the quantity by the relative delay τ, of the fixed length interferometer. At block 410, a current value of merit function F(f) is computed using the time-dependent frequency from block 409.

After the current value of merit function F(f) is evaluated in evaluate function block 405, estimate gradient block 411 is configured to estimate a gradient of merit function F(f). Estimate gradient block 411 is configured to determine the gradient by calculating the partial derivative of merit function F(f) with respect to each of parameters p. Block 412 includes perturbing the jth element of parameters p, computing a perturbed version of drive waveform $V(p_i+\Delta p_j)$, and uploading perturbed version of drive waveform $V(p_i+\Delta p_j)$ into a DAC. Block 413 includes evaluating a corresponding (perturbed) value of merit function $F(p_i+\Delta p_j)$, for example, using sub-operations of evaluate function block 405. At block 414, a partial derivative $\delta F/\delta p_j$ of merit function $F(p_i+\Delta p_j)$ is estimated with respect to the jth element of parameters p. Partial derivative $\delta F/\delta p_j$ is approximated using a finite difference. At block 415, is it determined if additional parameters p exist for perturbation. If more elements in parameters p exist, block 415 proceeds to block 416, where the value of j is incremented and estimate gradient block 411 is repeated. If each element in parameters p has been evaluated, block 415 proceeds to block 417.

In update block 417, calibration unit 403 updates parameters p based on an evaluation merit function F(f) (from evaluate function block 405) and an estimate of the gradient of merit function F(f) (from estimate gradient block 411). At block 418, calibration unit 403 performs a convergence check. The convergence check is an evaluation of how closely the frequency response of the laser match the defined merit function F(f) when driven with parameters p. If merit function F(f) has converged, then a final version of parameters p and hence an optimize drive signal V(t, p) is selected, and calibration unit 403 proceeds to block 419 to end.

Figure 5A:
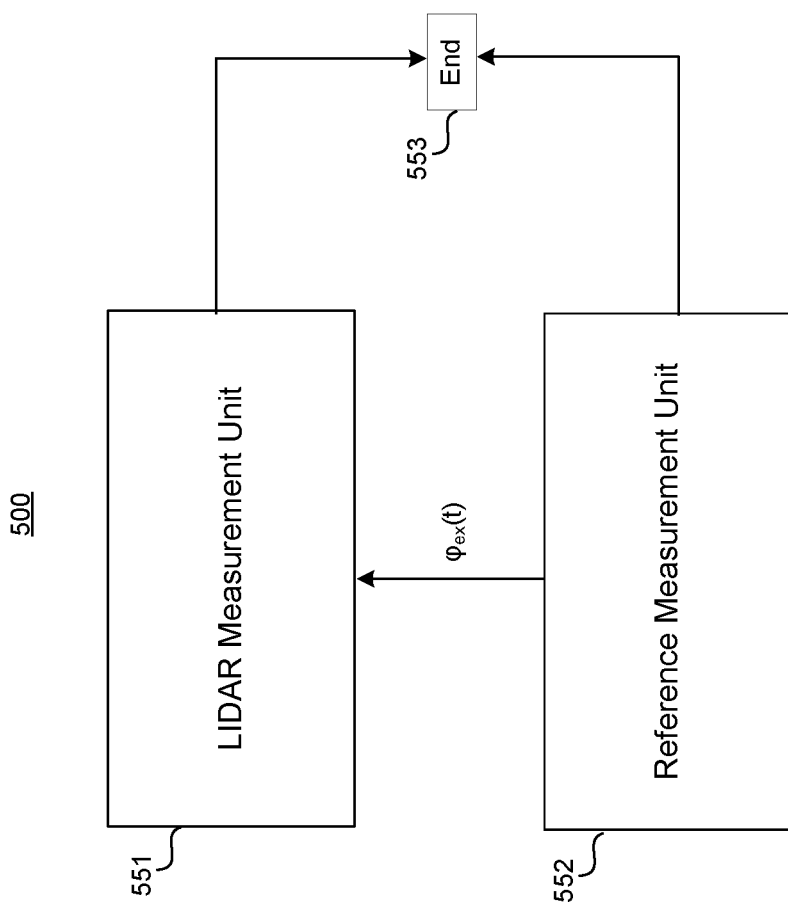
FIGS. 5A and 5B illustrate examples of multi-target identification systems for an FMCW LIDAR system, in accordance with implementations of the disclosure.
Figure 5B:
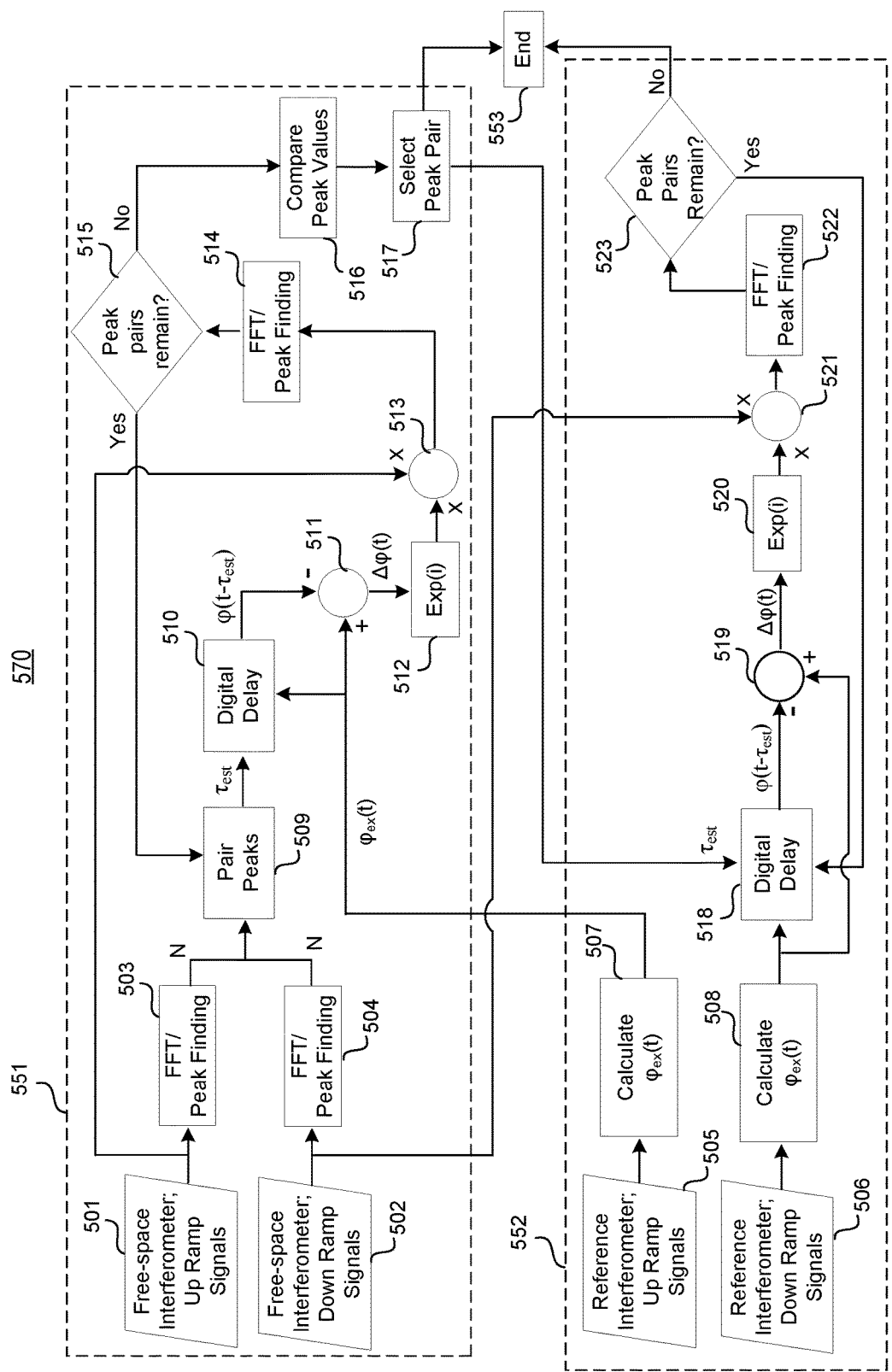

FIGS. 5A and 5B illustrate examples of multi-target identification systems that use reference phase measurements to identify multiple targets in an FMCW LIDAR system, in accordance with implementations of the disclosure. The multi-target identification systems apply phase measurement to pairings of multiple frequency spectrum return peaks in FMCW LIDAR beat signals.

FIG. 5A illustrates an example of multi-target identification system 500 for using reference phase measurements to identify multiple targets in an FMCW LIDAR system. Multi-target identification system 500 includes a LIDAR measurement unit 551 and a reference measurement unit 552. LIDAR measurement unit 551 includes some of the features of LIDAR measurement unit 301 (shown in FIGS. 3A and 3B), and reference measurement unit 552 includes some of the features of reference measurement unit 302 (shown in FIGS. 3A and 3B), according to one implementation.

LIDAR measurement unit 551 is configured to range multiple targets. LIDAR measurement unit 551 is configured to range multiple targets by identifying a first set of frequency spectrum peaks that have been generated from an upward frequency chirp of a laser source. LIDAR measurement unit 551 is configured to range multiple targets by identifying a second set of frequency spectrum peaks that have been generated from a downward frequency chirp of the laser source. LIDAR measurement unit 551 is configured to pair peaks from the first set of frequency spectrum peaks with peaks from the second set of frequency spectrum peaks, to confirm the existence of each of multiple targets and to estimate a time-of-flight to each of the multiple targets. LIDAR measurement unit 551 is configured to use the phase $\varphi_{ex}(t)$ of a reference beat signal to denoise a free-space beat signal from which the frequency spectrum peaks are derived.

Reference measurement unit 552 is configured to provide phase measurements of the laser source using a fixed-length interferometer. Reference measurement unit 552 is configured to determine a phase $\varphi_{ex}(t)$ of a reference beat signal from the fixed-length interferometer and to provide phase $\varphi_{ex}(t)$ of reference beat signal to LIDAR measurement unit 551 to enable LIDAR measurement unit 551 to cancel phase noise. Reference measurement unit 552 may calculate a first phase from a first reference beat signal created by an upward frequency chirp. Reference measurement unit 552 may calculate a second phase from a second reference beat signal created by a downward frequency chirp. Reference measurement unit 552 is configured to provide the first phase from the first reference beat to LIDAR measurement unit 551 to enable phase noise cancellation from a free-space beat signal from an upward frequency chirp. Reference measurement unit 552 is configured to use the second phase from the second reference beat to cancel phase noise from a free-space beat signal from a downward frequency chirp.

Operations of multi-target identification system 500 end at block 553.

FIG. 5B illustrates an example of a multi-target identification system 570 that uses reference phase measurements to identify multiple targets in an FMCW LIDAR system, in accordance with implementations of the disclosure. Multi-target identification system 570 is an example implementation of multi-target identification system 500.

Initially, beat signals are generated from a laser source. At block 501 a free-space beat signal is generated from a free-space interferometer using an upwards frequency chirp (up-ramp). At block 502 a free-space beat signal is generated from the free-space interferometer using a downwards frequency chirp (down-ramp). Both free-space beat signals are collected using the FMCW LIDAR system. These beat signals correspond to range and velocity measurements through free space. At block 503 the power spectral density (PSD) of the up-ramp beat signal is calculated, and the locations (frequencies) of the tallest N peaks are located in frequency spectrum for the up-ramp. At block 504 the power spectral density (PSD) of the down-ramp beat signal is calculated, and the locations (frequencies) of the tallest N peaks are located in frequency spectrum for the down-ramp.

In parallel with free-space interferometer measurements, at blocks 505 and 506 reference beat signals are generated from the same laser source. At block 505 a reference beat signal is generated from a reference (fixed-length) interferometer using an upwards frequency chirp (up-ramp). At block 506 a reference beat signal is generated from the reference interferometer using a downwards frequency chirp (down-ramp). At block 507 the phase $\varphi_{ex}(t)$ of the up-ramp beat signal is calculated. At block 508 the phase $\varphi_{ex}(t)$ of the down-ramp beat signal is calculated.

The N frequency spectrum peaks in the up-ramp PSD and down ramp PSD correspond to N different return paths in free-space. By pairing each peak in the up-ramp PSD with each peak in the down-ramp PSD correctly, the length of these paths, and the rate at which those path lengths are changing (i.e., relative velocity of the target) can be calculated. At block 509 the first peak in the up-ramp PSD is paired with the first peak in the down ramp PSD. This pairing yields an estimate for the target distance, velocity, and time-of-flight $\tau_{est}$. At block 510 time-dependent phase $\varphi_{ex}(t)$ of the laser up-ramp acquired from the reference interferometer is delayed. The delay applied to phase $\varphi_{ex}(t)$ is the duration of estimated time-of-flight Test, which generates delayed phase $\varphi_{ex}(t-\tau_{est})$. At block 511 delayed phase $\varphi_{ex}(t-\tau_{est})$ is subtracted from the undelayed time-dependent phase $\varphi_{ex}(t)$ of the laser up-ramp to produce delta phase $\Delta\varphi(t)$. Delta phase $\Delta\varphi(t)$ is the estimate of the contribution of phase noise and nonlinearity to the free-space beat signal generated by at block 501. At block 512 a conjugate phasor is constructed from delta phase $\Delta\varphi(t)$. At block 513 the conjugate phasor is multiplied with the free-space up-ramp beat signal to cancel the phase noise and produce a denoised beat signal. At block 514 the PSD of the denoised beat signal is calculated, and the resulting peaks are located.

Each set of peaks identified at block 509 is evaluated. At block 515 peak pairs are checked to determine if more (unevaluated) peak pairs remain in the up and down ramp PSDs. If peak pairs remain, blocks 509-515 are repeated for each remaining pair. If all pairs have been tested, block 515 proceeds to block 516. At block 516 the comparisons are made for peak values of the PSDs calculated for each pair, in order to determine which pairings were correct (correct pairings occur when the PSD peak values are maximized in the up-ramp). At block 517 peak pairings are selected after verification that the pairings are correct.

After the correct peak pairings have been selected in block 517, multi-target identification system 570 may proceed to block 553 to end operations. Alternatively, after block 517, multi-target identification system 570 may repeat removal of phase noise to improve the signal-to-noise ratio (SNR) of the down-ramp signals. Using the peak pairs, the distances of all of the measured path lengths are estimated. Based on these path lengths or based on estimated time-of-flight Test for the path lengths, at block 518 delayed phase $\varphi_{ex}(t-\tau_{est})$ is produced by delaying time-dependent phase $\varphi_{ex}(t)$ estimated for the down-ramp. At block 519 delayed phase $\varphi_{ex}(t-\tau_{est})$ is subtracted from the undelayed time-dependent phase $\varphi_{ex}(t)$ of the laser down-ramp to produce delta phase $\Delta\varphi(t)$. Delta phase $\Delta\varphi(t)$ is the estimate of the contribution of phase noise and nonlinearity to the free-space beat signal generated by the down-ramp at block 502. At block 520 a conjugate phasor is constructed from delta phase $\Delta\varphi(t)$. At block 521 the conjugate phasor is multiplied with the free-space down-ramp beat signal to cancel the phase noise and produce a denoised beat signal. At block 522 the PSD of the denoised beat signal is calculated, and the resulting peaks are located. At block 523 checks are made to determine if peak pairs remain. If so, the blocks 518-523 are repeated. If all peaks have been processed, the final distances and velocities of multiple targets can be computed, and block 523 proceeds to block 553 to end operations of multi-target identification system 570.

Figure 6A:
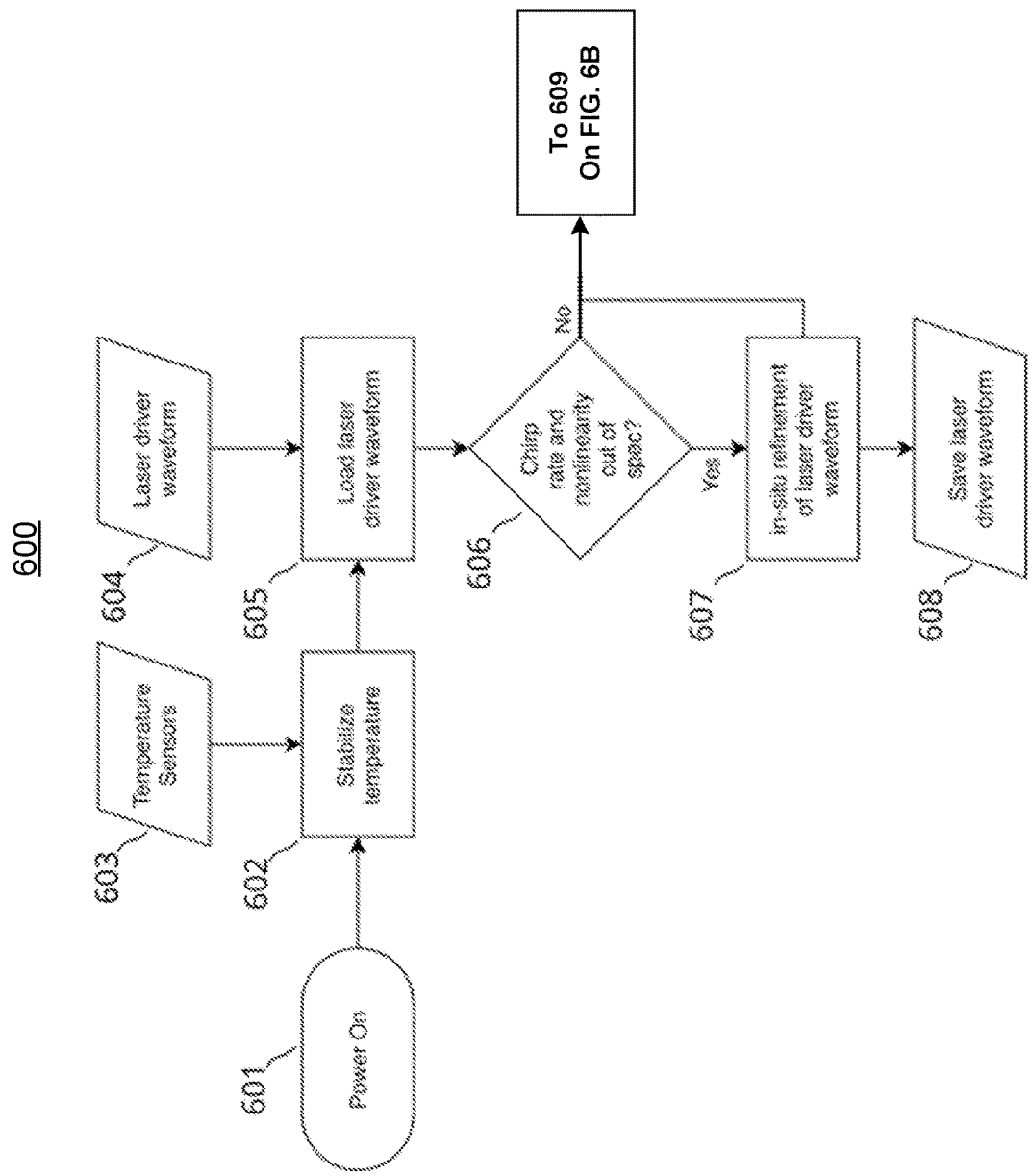
FIGS. 6A and 6B illustrate an example of an operation cycle of a LIDAR system that incorporates phase estimation, active phase cancellation, predistortion waveform generation, and peak pairing, according to various implementations of the disclosure.
Figure 6B:
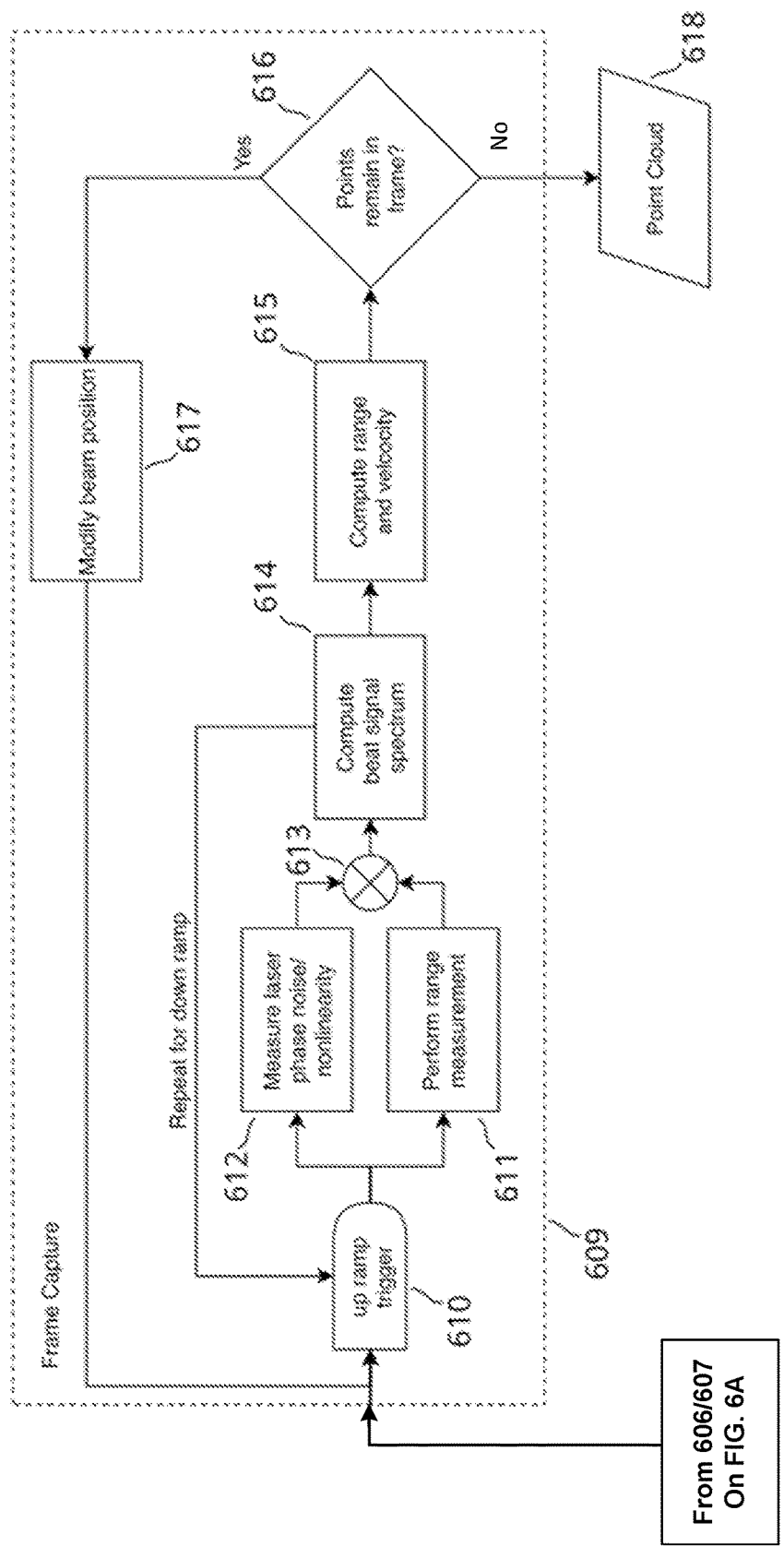

FIGS. 6A and 6B illustrate an example of an operation cycle 600 of an FMCW LIDAR that incorporates phase estimation, active phase cancellation, predistortion waveform generation, and peak pairing fit, according to various implementations of the disclosure.

At block 601, the system and laser are powered on. At block 602, the laser's temperature is allowed to stabilize, using data produced by temperature sensors 603. Once the laser temperature has stabilized, at block 605, the system loads an existing laser drive waveform 604, in order to modulate the laser frequency. Depending on wear on the system, changes in environmental state, etc., laser drive waveform 604 that has been loaded may not be optimal. At block 606, a check may be performed to determine if the frequency characteristics of the laser (e.g., chirp rate and chirp nonlinearity) satisfactorily meet specification. If laser characteristics are within specification, block 606 proceeds to block 609 (shown in FIG. 6B). If the laser characteristics are out of specification, block 606 proceeds to block 607. In block 607, in situ refinement of laser drive waveform 604 is performed. The in situ refinement may be performed in accordance with predistortion waveform generator 400 and/or predistortion waveform generator 430 (shown in FIGS. 4A and 4B). Block 607 proceeds to both block 608 and block 609 (shown in FIG. 6B). At block 608, the updated waveform is saved for the next power cycle.

Turning to FIG. 6B, if the existing version of laser drive waveform 604 meets specification, or alternatively, if the in situ refinement has completed, block 609 begins a process of capturing frame data. Block 609 may include a number of sub-operations. As the laser frequency is modulated, at block 610 the LIDAR system waits for a trigger indicating that an up-ramp (increasing frequency chirp) has begun. In response, at block 611 performance of a free-space FMCW LIDAR measurement is triggered, and, in parallel, at block 612 measurement of the time-dependent laser phase fluctuations (noise and nonlinearity) is triggered. Operations associated with blocks 611 and 612 may correspond to optical phase measurement apparatus 100 (shown in FIG. 1). The results of the measurements of block 611 and block 612 are combined at block 613. Operations at block 613 may represent operations of phase noise cancellation system 300 (shown in FIG. 3A), phase noise cancellation system 340 (shown in FIG. 3B), multi-target identification system 500 (shown in FIG. 5A), and/or multi-target identification system 570 (shown in FIG. 5B). Operations of block 613 may improve the fidelity of the free-space LIDAR measurements. At block 614 the beat signal spectrum is computed. Blocks 610-614 are repeated for a down-ramp. At block 615, based on the resulting filtered PSDs, the range and velocity of a point in a scene can be computed.

Typically, a LIDAR frame comprises more than one point. At block 616 the LIDAR system determines if more points remain in the frame. If more points remain in the frame, block 616 proceeds to block 617 where the position of the beam emitted by the FMCW LIDAR system is modified, and the up/down ramp capture process of blocks 610-615 is repeated. Once all points in the frame have been captured, block 616 proceeds to block 618 where a point cloud can be assembled, which completes operation cycle 600.

The order in which some or all of the process blocks appear in systems and process 300, 340, 400, 430, 500, 570, and/or 600 should not be deemed limiting. Rather, one of ordinary skill in the art having the benefit of the present disclosure will understand that some of the process blocks may be executed in a variety of orders not illustrated, or even in parallel.

Figure 7A:
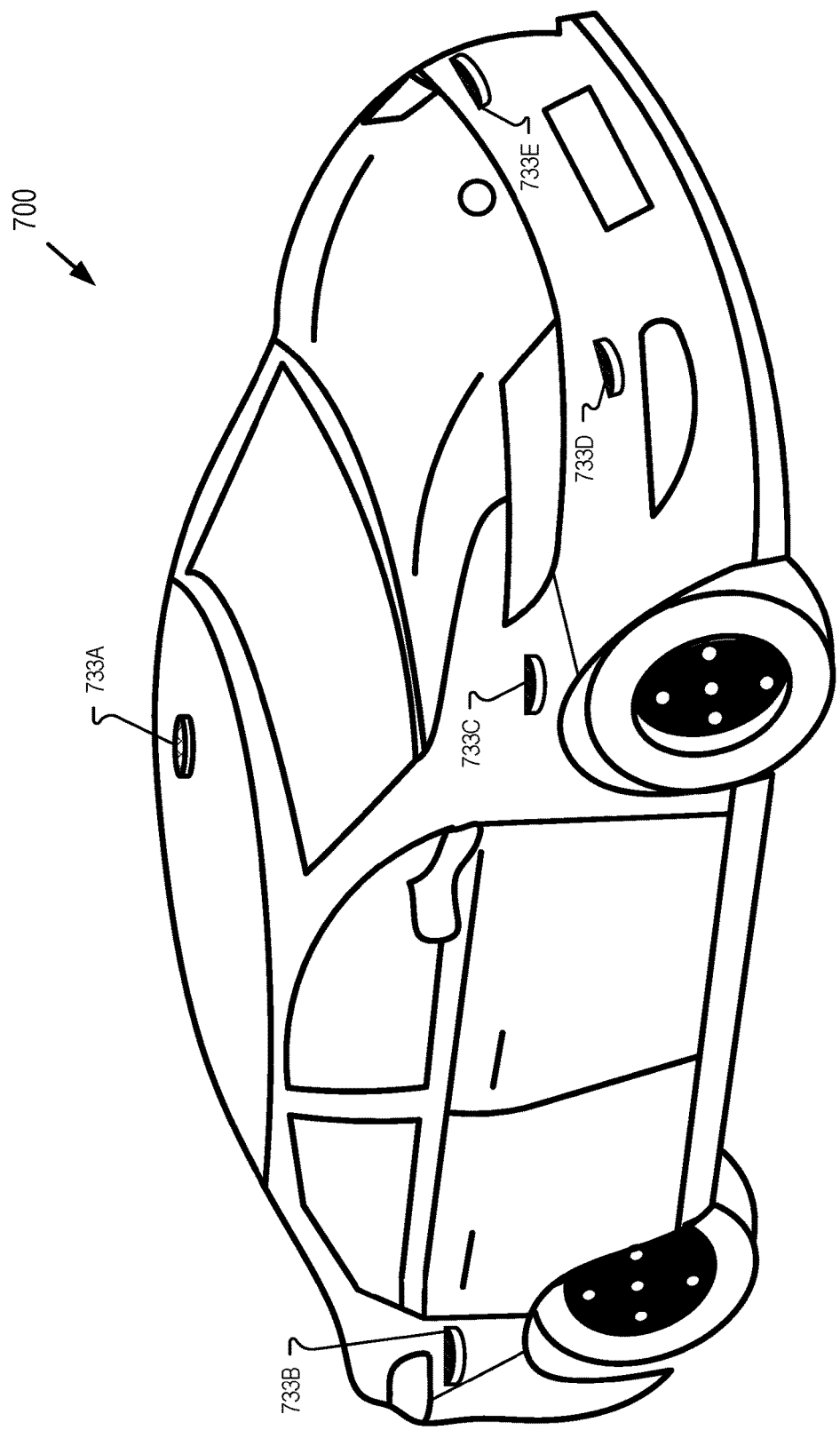
FIG. 7A illustrates an autonomous vehicle including an array of example sensors, in accordance with implementations of the disclosure.
Figure 7B:
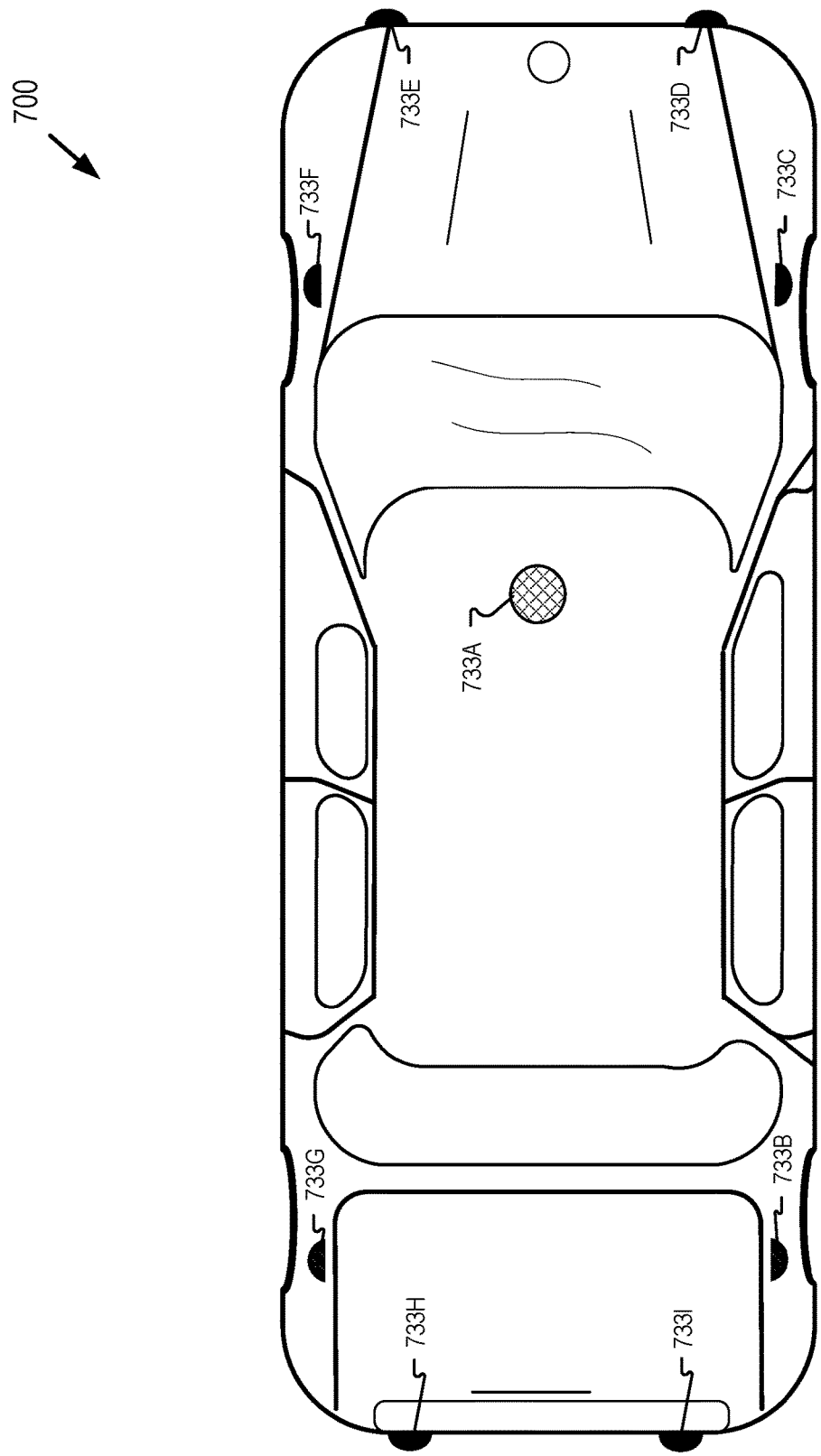
FIG. 7B illustrates a top view of an autonomous vehicle including an array of example sensors, in accordance with implementations of the disclosure.
Figure 7C:
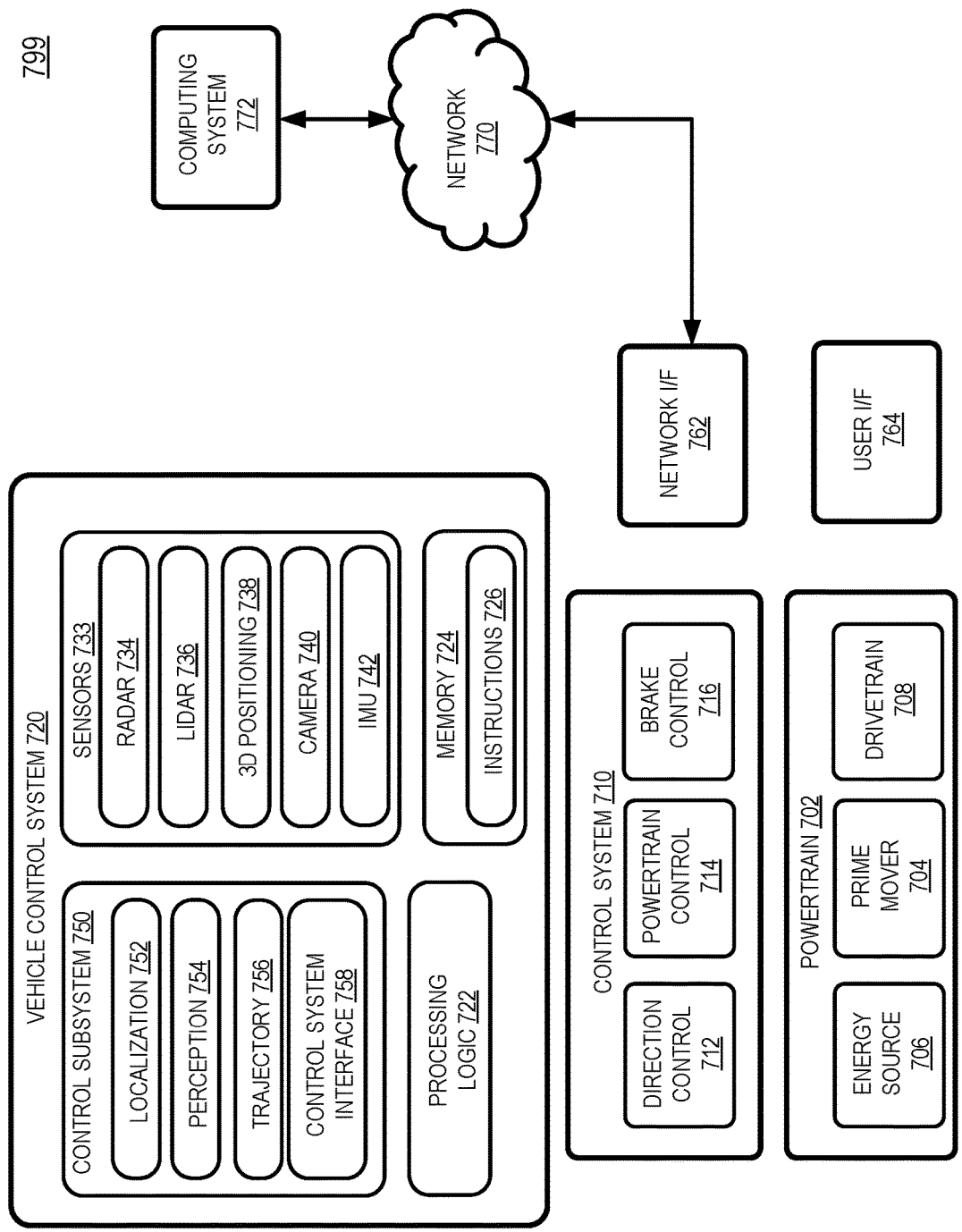
FIG. 7C illustrates an example vehicle control system including sensors, a drivetrain, and a control system, in accordance with implementations of the disclosure.

FIG. 7A illustrates an example autonomous vehicle 700 that may include the LIDAR designs of FIGS. 1-6, in accordance with aspects of the disclosure. The illustrated autonomous vehicle 700 includes an array of sensors configured to capture one or more objects of an external environment of the autonomous vehicle and to generate sensor data related to the captured one or more objects for purposes of controlling the operation of autonomous vehicle 700. FIG. 7A shows sensors 733A, 733B, 733C, 733D, and 733E. FIG. 7B illustrates a top view of autonomous vehicle 700 including sensors 733F, 733G, 733H, and 733I in addition to sensors 733A, 733B, 733C, 733D, and 733E. Any of sensors 733A, 733B, 733C, 733D, 733E, 733F, 733G, 733H, and/or 733I may include LIDAR devices that include the designs of FIGS. 1-6. FIG. 7C illustrates a block diagram of an example system 799 for autonomous vehicle 700. For example, autonomous vehicle 700 may include powertrain 702 including prime mover 704 powered by energy source 706 and capable of providing power to drivetrain 708. Autonomous vehicle 700 may further include control system 710 that includes direction control 712, powertrain control 714, and brake control 716. Autonomous vehicle 700 may be implemented as any number of different vehicles, including vehicles capable of transporting people and/or cargo and capable of traveling in a variety of different environments. It will be appreciated that the aforementioned components 702-716 can vary widely based upon the type of vehicle within which these components are utilized.

The implementations discussed hereinafter, for example, will focus on a wheeled land vehicle such as a car, van, truck, or bus. In such implementations, prime mover 704 may include one or more electric motors and/or an internal combustion engine (among others). The energy source may include, for example, a fuel system (e.g., providing gasoline, diesel, hydrogen), a battery system, solar panels or other renewable energy source, and/or a fuel cell system. Drivetrain 708 may include wheels and/or tires along with a transmission and/or any other mechanical drive components suitable for converting the output of prime mover 704 into vehicular motion, as well as one or more brakes configured to controllably stop or slow the autonomous vehicle 700 and direction or steering components suitable for controlling the trajectory of the autonomous vehicle 700 (e.g., a rack and pinion steering linkage enabling one or more wheels of autonomous vehicle 700 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles). In some implementations, multiple electric motors (e.g., dedicated to individual wheels or axles) may be used as a prime mover.

Direction control 712 may include one or more actuators and/or sensors for controlling and receiving feedback from the direction or steering components to enable the autonomous vehicle 700 to follow a desired trajectory. Powertrain control 714 may be configured to control the output of powertrain 702, e.g., to control the output power of prime mover 704, to control a gear of a transmission in drivetrain 708, thereby controlling a speed and/or direction of the autonomous vehicle 700. Brake control 716 may be configured to control one or more brakes that slow or stop autonomous vehicle 700, e.g., disk or drum brakes coupled to the wheels of the vehicle.

Other vehicle types, including but not limited to off-road vehicles, all-terrain or tracked vehicles, or construction equipment will necessarily utilize different powertrains, drivetrains, energy sources, direction controls, powertrain controls and brake controls, as will be appreciated by those of ordinary skill having the benefit of the instant disclosure. Moreover, in some implementations some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, autonomous control over autonomous vehicle 700 is implemented in vehicle control system 720, which may include one or more processors in processing logic 722 and one or more memories 724, with processing logic 722 configured to execute program code (e.g., instructions 726) stored in memory 724. Processing logic 722 may include graphics processing unit(s) (GPUs) and/or central processing unit(s) (CPUs), for example. Vehicle control system 720 may be configured to control powertrain 702 of autonomous vehicle 700 in response to an output of the optical mixer of a LIDAR pixel. Vehicle control system 720 may be configured to control powertrain 702 of autonomous vehicle 700 in response to outputs from a plurality of LIDAR pixels. Vehicle control system 720 may be configured to control powertrain 702 of autonomous vehicle 700 in response to outputs from microcomputer 203 generated based on signals received from FPA system 202.

Sensors 733A-733I may include various sensors suitable for collecting data from an autonomous vehicle's surrounding environment for use in controlling the operation of the autonomous vehicle. For example, sensors 733A-733I can include RADAR unit 734, LIDAR unit 736, 3D positioning sensor(s) 738, e.g., a satellite navigation system such as GPS, GLONASS, BeiDou, Galileo, or Compass. The LIDAR designs of FIGS. 1-6 may be included in LIDAR unit 736. LIDAR unit 736 may include a plurality of LIDAR sensors that are distributed around autonomous vehicle 700, for example. In some implementations, 3D positioning sensor(s) 738 can determine the location of the vehicle on the Earth using satellite signals. Sensors 733A-733I can optionally include one or more ultrasonic sensors, one or more cameras 740, and/or an Inertial Measurement Unit (IMU) 742. In some implementations, camera 740 can be a monographic or stereographic camera and can record still and/or video images. Camera 740 may include a Complementary Metal-Oxide-Semiconductor (CMOS) image sensor configured to capture images of one or more objects in an external environment of autonomous vehicle 700. IMU 742 can include multiple gyroscopes and accelerometers capable of detecting linear and rotational motion of autonomous vehicle 700 in three directions. One or more encoders (not illustrated) such as wheel encoders may be used to monitor the rotation of one or more wheels of autonomous vehicle 700.

The outputs of sensors 733A-733I may be provided to control subsystems 750, including, localization subsystem 752, trajectory subsystem 756, perception subsystem 754, and control system interface 758. Localization subsystem 752 is configured to determine the location and orientation (also sometimes referred to as the "pose") of autonomous vehicle 700 within its surrounding environment, and generally within a particular geographic area. The location of an autonomous vehicle can be compared with the location of an additional vehicle in the same environment as part of generating labeled autonomous vehicle data. Perception subsystem 754 may be configured to detect, track, classify, and/or determine objects within the environment surrounding autonomous vehicle 700. Trajectory subsystem 756 is configured to generate a trajectory for autonomous vehicle 700 over a particular timeframe given a desired destination as well as the static and moving objects within the environment. A machine learning model in accordance with several implementations can be utilized in generating a vehicle trajectory. Control system interface 758 is configured to communicate with control system 710 in order to implement the trajectory of the autonomous vehicle 700. In some implementations, a machine learning model can be utilized to control an autonomous vehicle to implement the planned trajectory.

It will be appreciated that the collection of components illustrated in FIG. 7C for vehicle control system 720 is merely exemplary in nature. Individual sensors may be omitted in some implementations. In some implementations, different types of sensors illustrated in FIG. 7C may be used for redundancy and/or for covering different regions in an environment surrounding an autonomous vehicle. In some implementations, different types and/or combinations of control subsystems may be used. Further, while subsystems 752-758 are illustrated as being separate from processing logic 722 and memory 724, it will be appreciated that in some implementations, some or all of the functionality of subsystems 752-758 may be implemented with program code such as instructions 726 resident in memory 724 and executed by processing logic 722, and that these subsystems 752-758 may in some instances be implemented using the same processor(s) and/or memory. Subsystems in some implementations may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in vehicle control system 720 may be networked in various manners.

In some implementations, autonomous vehicle 700 may also include a secondary vehicle control system (not illustrated), which may be used as a redundant or backup control system for autonomous vehicle 700. In some implementations, the secondary vehicle control system may be capable of operating autonomous vehicle 700 in response to a particular event. The secondary vehicle control system may only have limited functionality in response to the particular event detected in primary vehicle control system 720. In still other implementations, the secondary vehicle control system may be omitted.

In some implementations, different architectures, including various combinations of software, hardware, circuit logic, sensors, and networks may be used to implement the various components illustrated in FIG. 7C. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), or read-only memories. In addition, each memory may be considered to include memory storage physically located elsewhere in autonomous vehicle 700, e.g., any cache memory in a processor, as well as any storage capacity used as a virtual memory, e.g., as stored on a mass storage device or another computer controller. Processing logic 722 illustrated in FIG. 7C, or entirely separate processing logic, may be used to implement additional functionality in autonomous vehicle 700 outside of the purposes of autonomous control, e.g., to control entertainment systems, to operate doors, lights, or convenience features.

In addition, for additional storage, autonomous vehicle 700 may also include one or more mass storage devices, e.g., a removable disk drive, a hard disk drive, a direct access storage device ("DASD"), an optical drive (e.g., a CD drive, a DVD drive), a solid state storage drive ("SSD"), network attached storage, a storage area network, and/or a tape drive, among others. Furthermore, autonomous vehicle 700 may include a user interface 764 to enable autonomous vehicle 700 to receive a number of inputs from a passenger and generate outputs for the passenger, e.g., one or more displays, touchscreens, voice and/or gesture interfaces, buttons and other tactile controls. In some implementations, input from the passenger may be received through another computer or electronic device, e.g., through an app on a mobile device or through a web interface.

In some implementations, autonomous vehicle 700 may include one or more network interfaces, e.g., network interface 762, suitable for communicating with one or more networks 770 (e.g., a local area network ("LAN"), a wide area network ("WAN"), a wireless network, and/or the Internet, among others) to permit the communication of information with other computers and electronic devices, including, for example, a central service, such as a cloud service, from which autonomous vehicle 700 receives environmental and other data for use in autonomous control thereof. In some implementations, data collected by one or more sensors 733A-733I can be uploaded to computing system 772 through network 770 for additional processing. In such implementations, a time stamp can be associated with each instance of vehicle data prior to uploading.

Processing logic 722 illustrated in FIG. 7C, as well as various additional controllers and subsystems disclosed herein, generally operates under the control of an operating system and executes or otherwise relies upon various computer software applications, components, programs, objects, modules, or data structures, as may be described in greater detail below. Moreover, various applications, components, programs, objects, or modules may also execute on one or more processors in another computer coupled to autonomous vehicle 700 through network 770, e.g., in a distributed, cloud-based, or client-server computing environment, whereby the processing required to implement the functions of a computer program may be allocated to multiple computers and/or services over a network.

Routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter may be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets), it should be appreciated that the invention is not limited to the specific organization and allocation of program functionality described herein.

Those skilled in the art, having the benefit of the present disclosure, will recognize that the exemplary environment illustrated in FIG. 7C is not intended to limit implementations disclosed herein. Indeed, those skilled in the art will recognize that other alternative hardware and/or software environments may be used without departing from the scope of implementations disclosed herein.

The term "processing logic" (e.g., processing logic 722) in this disclosure may include one or more processors, microprocessors, multi-core processors, Application-specific integrated circuits (ASIC), and/or Field Programmable Gate Arrays (FPGAs) to execute operations disclosed herein. In some implementations, memories (not illustrated) are integrated into the processing logic to store instructions to execute operations and/or store data. Processing logic may also include analog or digital circuitry to perform the operations in accordance with implementations of the disclosure.

A "unit" in this disclosure may be constructed with hardware components (e.g., AND, OR, NOR, XOR gates), may be implemented as circuitry imbedded in one or more processors, ASICs, FPGAs, or photonic integrated circuits (PIC), and/or may be partially defined as software instructions stored in one or more memories within a LIDAR system. As an example, the various units disclosed herein may be at least partially implemented in LIDAR processing engine 201, microcomputer 203, laser controller 205, and/or FPA driver 209 (shown in FIG. 2), according to implementations of the present disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A Network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated implementations of the invention, including what is described in the Abstract, is not intended to be exhaustive or to limit the invention to the precise forms disclosed. While specific implementations of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific implementations disclosed in the specification. Rather, the scope of the invention is to be determined entirely by the following claims, which are to be construed in accordance with established doctrines of claim interpretation.

What is claimed is:

1. A light detection and ranging (LIDAR) system comprising:
  a laser configured to generate a laser beam based on a particular laser waveform that is associated with at least one parameter of a plurality of parameters; and
  a calibration unit configured to reduce distortion in the laser using a derivative of a merit function with respect to the at least one parameter of the plurality of parameters to update the at least one parameter of the plurality of parameters with a value that reduces a value of the merit function, wherein the merit function is a function of a time-dependent frequency of the laser beam, wherein the calibration unit is configured to update the particular laser waveform with the at least one parameter of the plurality of parameters.

2. The LIDAR system of claim 1 further comprising:
  an interferometer configured to provide a reference signal, wherein the calibration unit is configured to receive an in-phase signal and a quadrature signal from the interferometer, wherein the calibration unit is configured to determine the time-dependent frequency of the laser beam based on the in-phase signal and the quadrature signal.

3. The LIDAR system of claim 1, wherein the plurality of parameters have initial values and one or more of the initial values are superseded by one or more updated values.

4. The LIDAR system of claim 1, wherein the calibration unit is configured to evaluate the merit function with updated values of the plurality of parameters.

5. The LIDAR system of claim 4, wherein to evaluate the merit function, the calibration unit is configured to load the particular laser waveform into a digital to analog converter, measure an output from an interferometer, and calculate the time-based frequency of the laser beam based on the output from the interferometer.

6. The LIDAR system of claim 1, wherein the calibration unit is configured to calculate a gradient of the merit function with respect to the at least one parameter of the plurality of parameters.

7. The LIDAR system of claim 1, wherein a first parameter of the plurality of parameters includes a shape of the particular laser waveform and a second parameter of the plurality of parameters includes a behavior of the particular laser waveform.

8. The LIDAR system of claim 1, wherein the calibration unit is configured to update the plurality of parameters based on a partial derivative of the merit function with respect to at least one parameter of the plurality of parameters.

9. The LIDAR system of claim 1, wherein the calibration unit is configured to update the plurality of parameters to compensate for distortion characteristics of the laser.

10. An autonomous vehicle control system comprising:
a light detection and ranging (LIDAR) system including:
a laser configured to generate a laser beam based on a particular laser waveform that is associated with at least one parameter of a plurality of parameters; and
a calibration unit configured to reduce distortion in the laser using a derivative of a merit function with respect to the at least one parameter of the plurality of parameters to update the at least one parameter of the plurality of parameters with a value that reduces a value of the merit function, wherein the merit function is a function of a time-dependent frequency of the laser beam, wherein the calibration unit is configured to update the particular laser waveform with the at least one parameter of the plurality of parameters; and
one or more processors to control the autonomous vehicle control system in response to the particular laser waveform at least partially updated by the calibration unit.

11. The autonomous vehicle control system of claim 10 further comprising:
an interferometer,
wherein the calibration unit is configured to receive an in-phase signal and a quadrature signal from the interferometer,
wherein the calibration unit is configured to determine the time-dependent frequency of the laser beam based on the in-phase signal and the quadrature signal.

12. The LIDAR system of claim 10, wherein the plurality of parameters have initial values and one or more of the initial values is superseded by one or more updated values.

13. The LIDAR system of claim 10, wherein the calibration unit is configured to evaluate the merit function with updated values of the plurality of parameters.

14. The LIDAR system of claim 13, wherein to evaluate the merit function, the calibration unit is configured to load the particular laser waveform into a digital to analog converter, measure an output from an interferometer, and calculate the time-based frequency of the laser beam based on the output from the interferometer.

15. The LIDAR system of claim 10, wherein the calibration unit is configured to calculate a gradient of the merit function with respect to the at least one parameter of the plurality of parameters.

16. An autonomous vehicle comprising:
a light detection and ranging (LIDAR) system including:
a laser configured to generate a laser beam based on a particular laser waveform that is associated; with at least one parameter of a plurality of parameters; and
a calibration unit configured to reduce distortion in the laser using a derivative of a merit function with respect to the at least one parameter of the plurality of parameters to update the at least one parameter of the plurality of parameters with a value that reduces a value of the merit function, wherein the merit function is a function of a time-dependent frequency of the laser beam, wherein the calibration unit is configured to update the particular laser waveform with the at least one parameter of plurality of parameters; and
one or more processors to control the autonomous vehicle in response to the particular laser waveform at least partially updated by the calibration unit.

17. The autonomous vehicle of claim 16, wherein the calibration unit is configured to evaluate the merit function of the laser with updated values of the plurality of parameters.

18. The autonomous vehicle of claim 16, wherein the calibration unit is configured to calculate a gradient of the merit function with respect to the at least one parameter of the plurality of parameters.

* * * * *